US009685828B2

(12) United States Patent
Mariotto

(10) Patent No.: US 9,685,828 B2
(45) Date of Patent: Jun. 20, 2017

(54) ELECTRIC MACHINE WITH MULTIPLE AIR GAPS AND A 3D MAGNETIC FLUX

(71) Applicants: AIRBUS HELICOPTERS, Marignane (FR); SINTERTECH, Veurey-Voroize (FR); MBDA FRANCE, Paris (FR)

(72) Inventor: Damien Mariotto, Lambesc (FR)

(73) Assignees: Airbus Helicopters, Marignane (FR); Sintertech, Veurey-Voroize (FR); MBDA France, Paris (FR)

( * ) Notice: Subject to any disclaimer, the term of this patent is extended or adjusted under 35 U.S.C. 154(b) by 688 days.

(21) Appl. No.: 14/147,874

(22) Filed: Jan. 6, 2014

(65) Prior Publication Data
US 2014/0191612 A1   Jul. 10, 2014

(30) Foreign Application Priority Data

Jan. 9, 2013   (FR) ..................... 13 00029

(51) Int. Cl.
*H02K 1/14*   (2006.01)
*H02K 21/22*   (2006.01)
(Continued)

(52) U.S. Cl.
CPC ............. *H02K 1/145* (2013.01); *H02K 1/182* (2013.01); *H02K 3/525* (2013.01); *H02K 3/528* (2013.01);
(Continued)

(58) Field of Classification Search
CPC ........ H02K 1/145; H02K 3/325; H02K 3/525; H02K 3/528; H02K 15/022; H02K 1/182;
(Continued)

(56) References Cited

U.S. PATENT DOCUMENTS 3,508,091 A * 4/1970 Kavanaugh .......... H02K 21/145
310/156.26
6,175,178 B1   1/2001 Tupper et al.
(Continued)

FOREIGN PATENT DOCUMENTS

CN   101212150   7/2008
EP   0613229   8/1994
(Continued)

OTHER PUBLICATIONS

French Search Report for FR 1300029, Completed by the French Patent Office on Feb. 13, 2014, 7 Pages.

*Primary Examiner* — Burton Mullins
*Assistant Examiner* — Alexander Singh
(74) *Attorney, Agent, or Firm* — Brooks Kushman P.C.

(57) ABSTRACT

An electric machine includes a stator and a rotor, with the stator being equipped with at least one annular exciter unit that includes a coil and at least two annular yokes, with the rotor being equipped with a structure and at least one annular receiver unit. Each receiver unit includes at least two rows of magnets. Two sides of each yoke include teeth distributed angularly in a regular manner, and the teeth of the two adjacent yokes fit onto a face of the exciter unit, alternately forming north poles and south poles. Each row of the magnets is positioned opposite one face, forming an air gap with the exciter unit, with the electric machine thus including at least two air gaps, with a 3D magnetic flux thus circulating inside the said electric machine, dividing and regrouping itself in the vicinity of the magnets and of the yokes.

20 Claims, 14 Drawing Sheets

(51) Int. Cl.
*H02K 21/24* (2006.01)
*H02K 1/18* (2006.01)
*H02K 3/52* (2006.01)
*H02K 15/02* (2006.01)
*H02K 21/02* (2006.01)
*H02K 21/12* (2006.01)
*H02K 21/14* (2006.01)

(52) U.S. Cl.
CPC ......... *H02K 15/022* (2013.01); *H02K 21/026* (2013.01); *H02K 21/125* (2013.01); *H02K 21/145* (2013.01); *H02K 21/22* (2013.01); *H02K 21/24* (2013.01); *H02K 2201/12* (2013.01)

(58) Field of Classification Search
CPC .... H02K 1/2793; H02K 21/026; H02K 21/24; H02K 21/25; H02K 21/125; H02K 21/22; H02K 21/145; H02K 2201/12
USPC .................. 310/257, 49.42, 156.32, 349
See application file for complete search history.

(56) References Cited

U.S. PATENT DOCUMENTS

| | | | |
|---|---|---|---|
| 6,177,746 B1 | 1/2001 | Tupper et al. | |
| 7,279,820 B2 | 10/2007 | Grundl et al. | |
| 2005/0121989 A1* | 6/2005 | Suzuki | H02K 29/08 310/156.06 |
| 2007/0164628 A1* | 7/2007 | Fonseca | B60L 11/123 310/112 |
| 2008/0018195 A1 | 1/2008 | Kitamura et al. | |
| 2010/0219711 A1* | 9/2010 | Gruendl | H02K 26/00 310/156.25 |
| 2012/0119599 A1 | 5/2012 | Calley et al. | |
| 2013/0099619 A1* | 4/2013 | Bernot | H02K 1/145 310/178 |

FOREIGN PATENT DOCUMENTS

| | | |
|---|---|---|
| EP | 1770846 | 4/2007 |
| FR | 2828027 | 1/2003 |
| FR | 2959621 | 11/2011 |
| FR | 2961037 | 12/2011 |
| WO | 2004107541 | 12/2004 |

\* cited by examiner

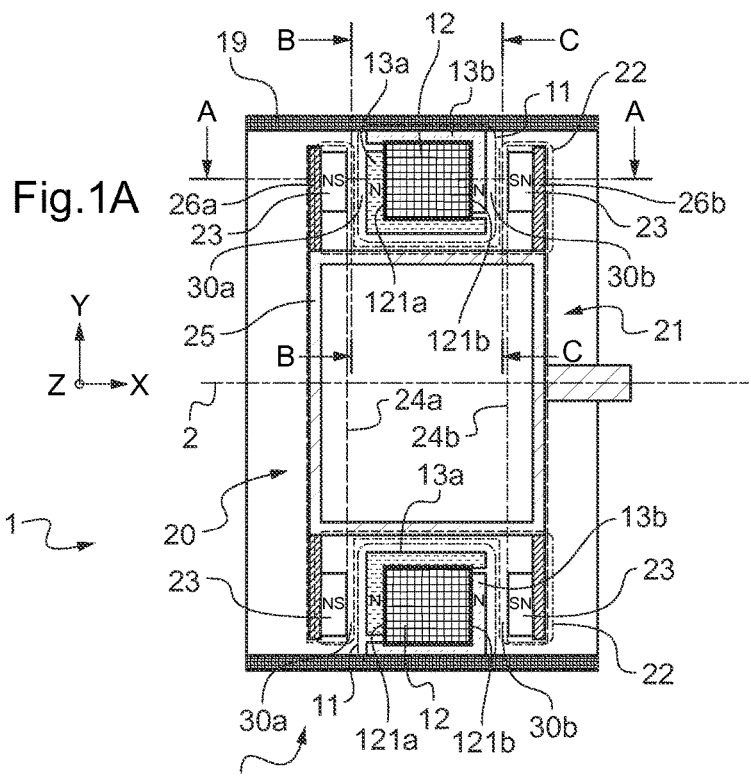
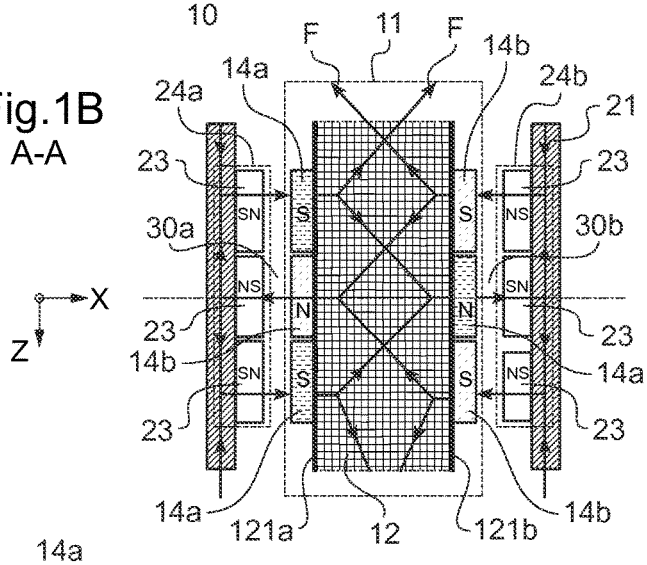

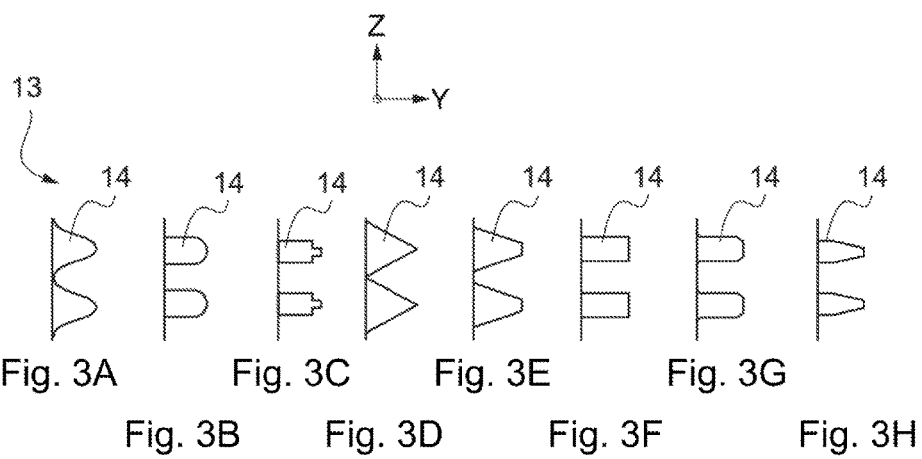
Fig. 3A  Fig. 3C  Fig. 3E  Fig. 3G
　Fig. 3B  Fig. 3D  Fig. 3F  Fig. 3H
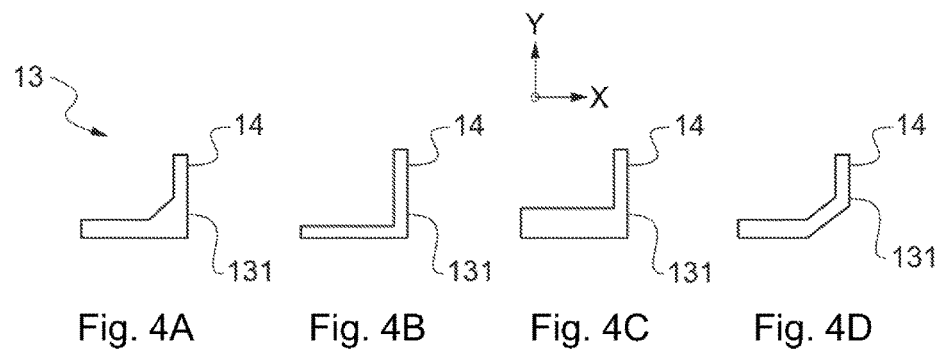
Fig. 4A  Fig. 4B  Fig. 4C  Fig. 4D

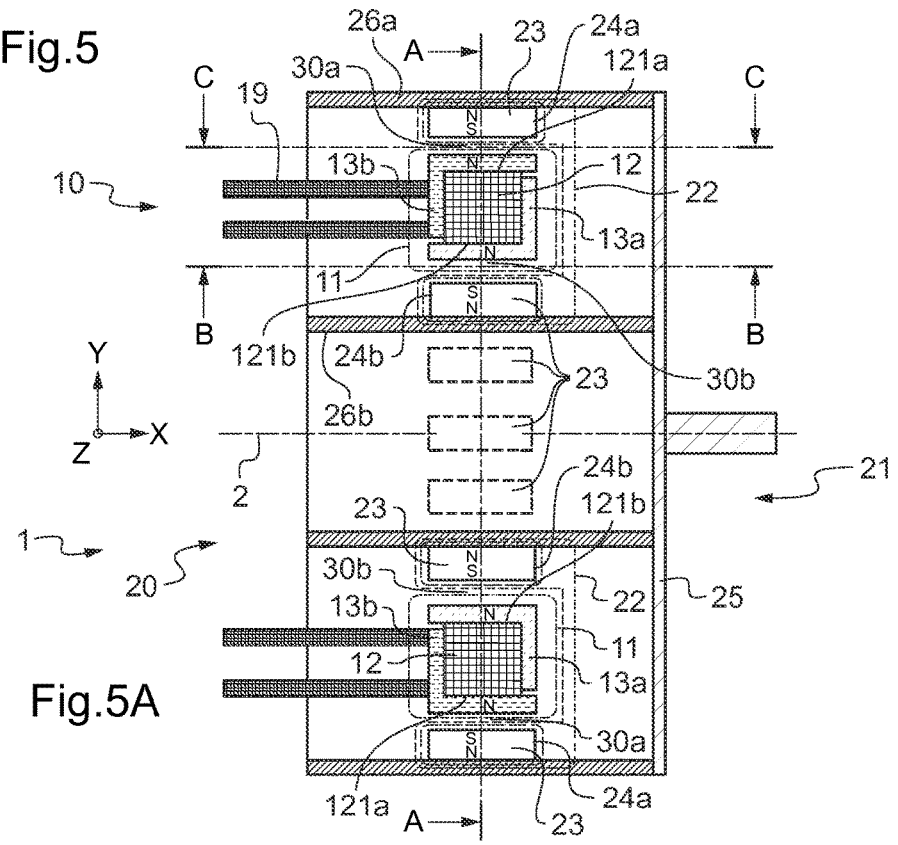
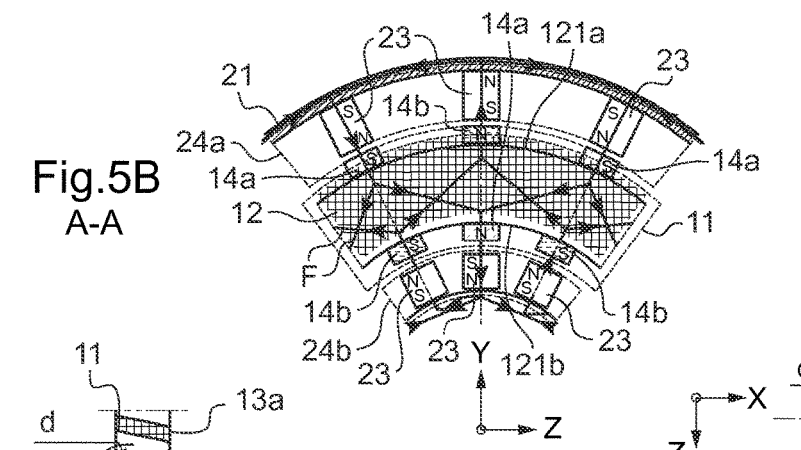
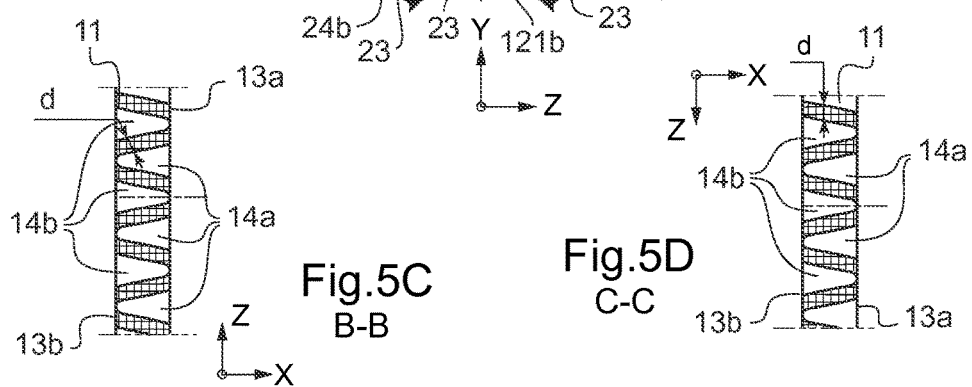

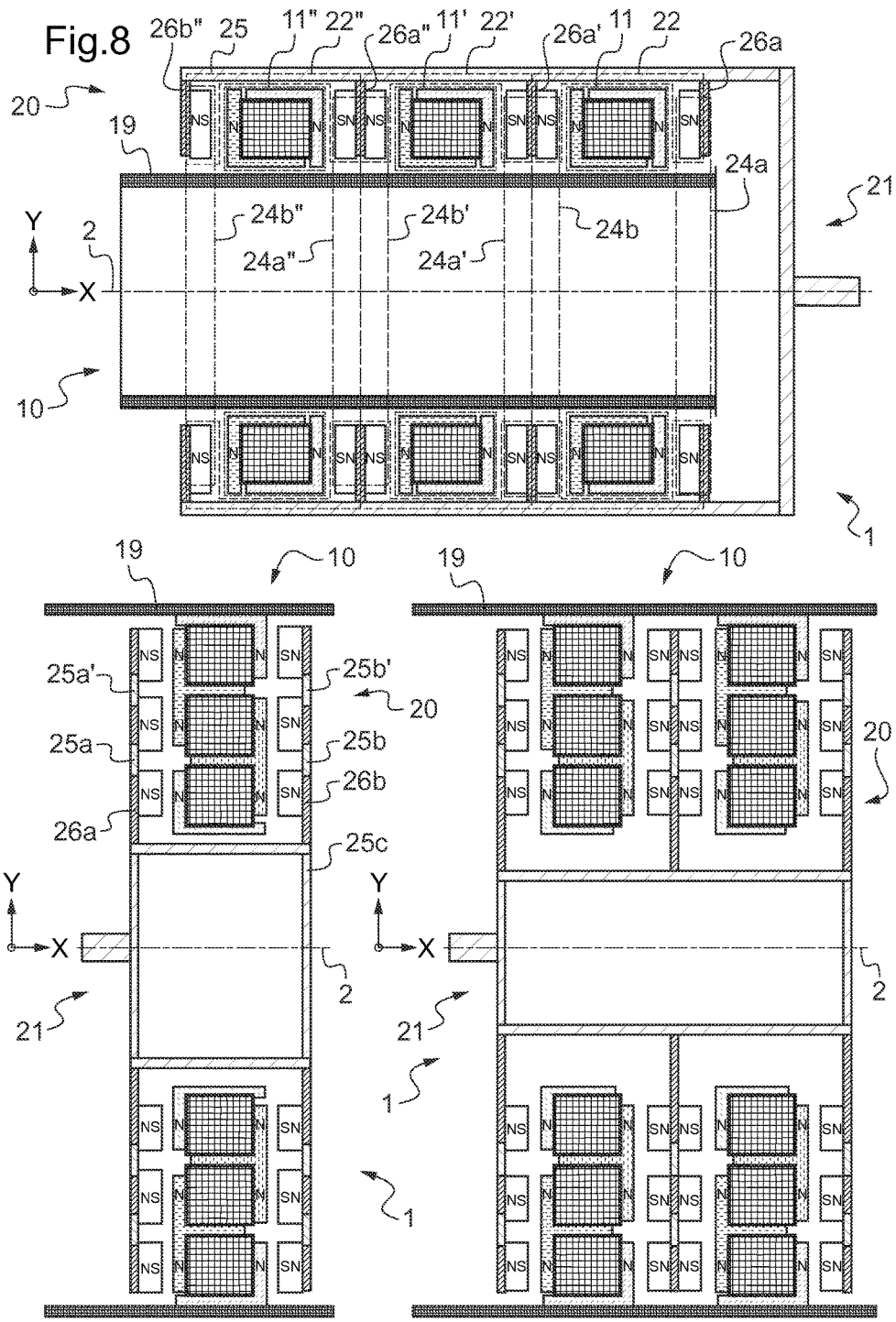

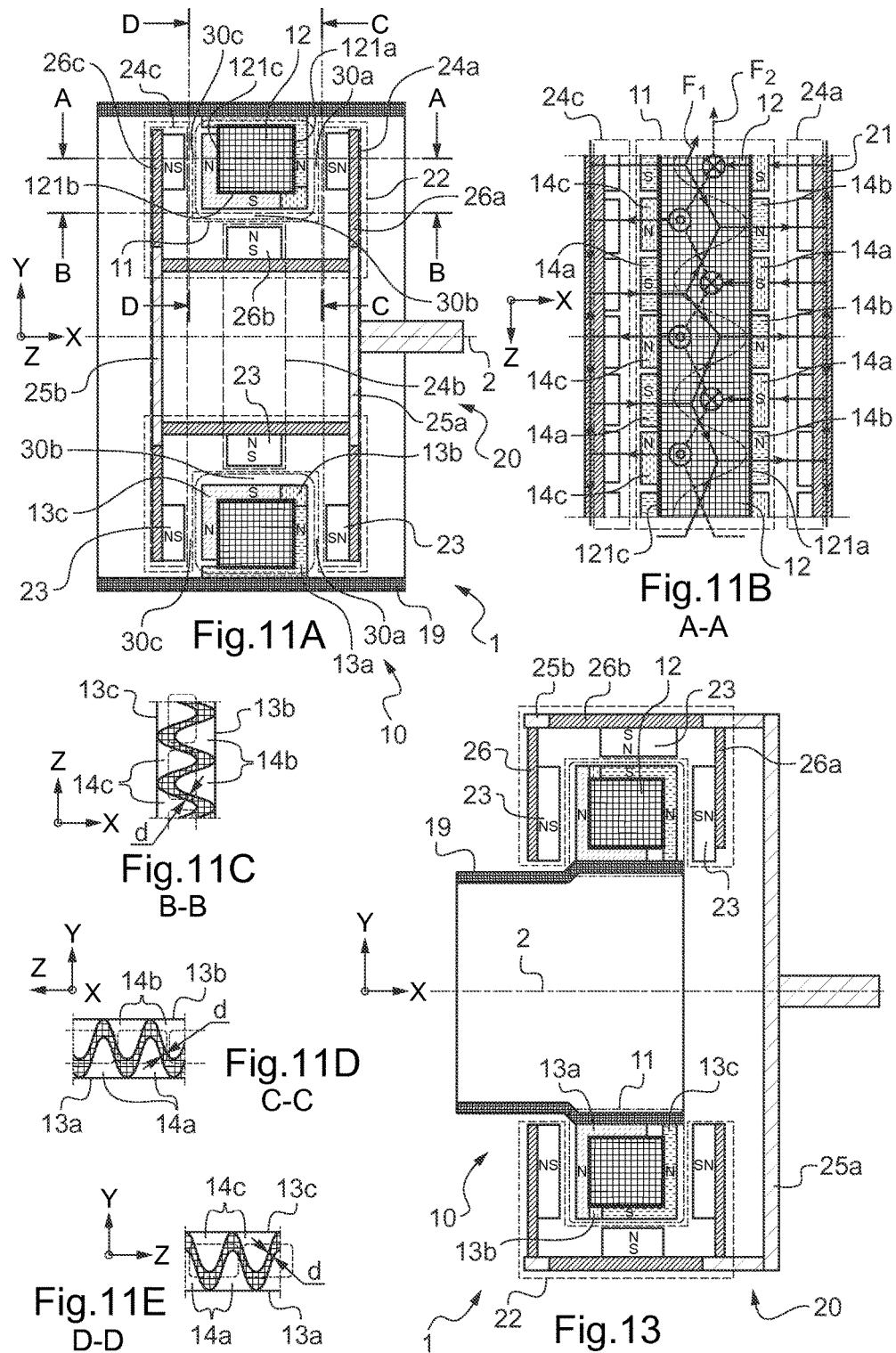

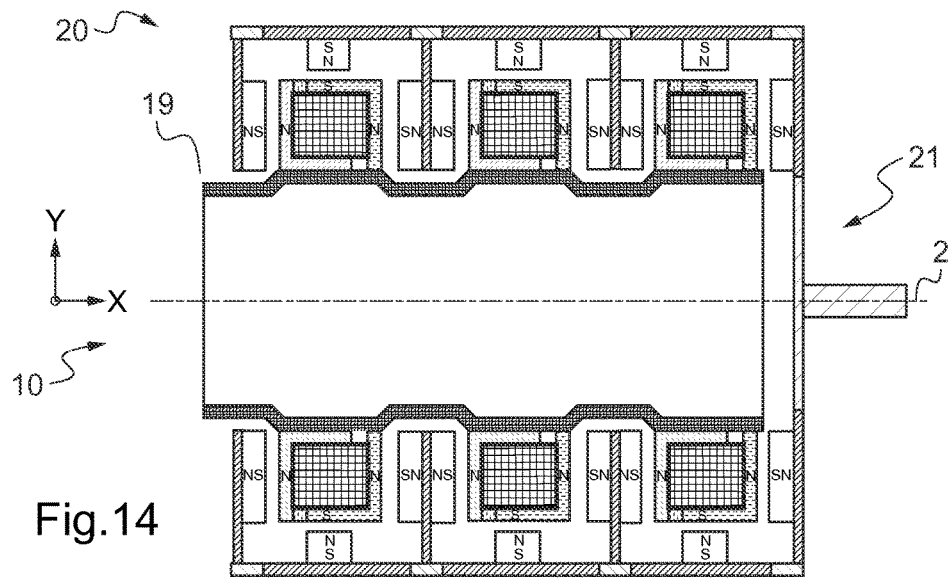
Fig.14
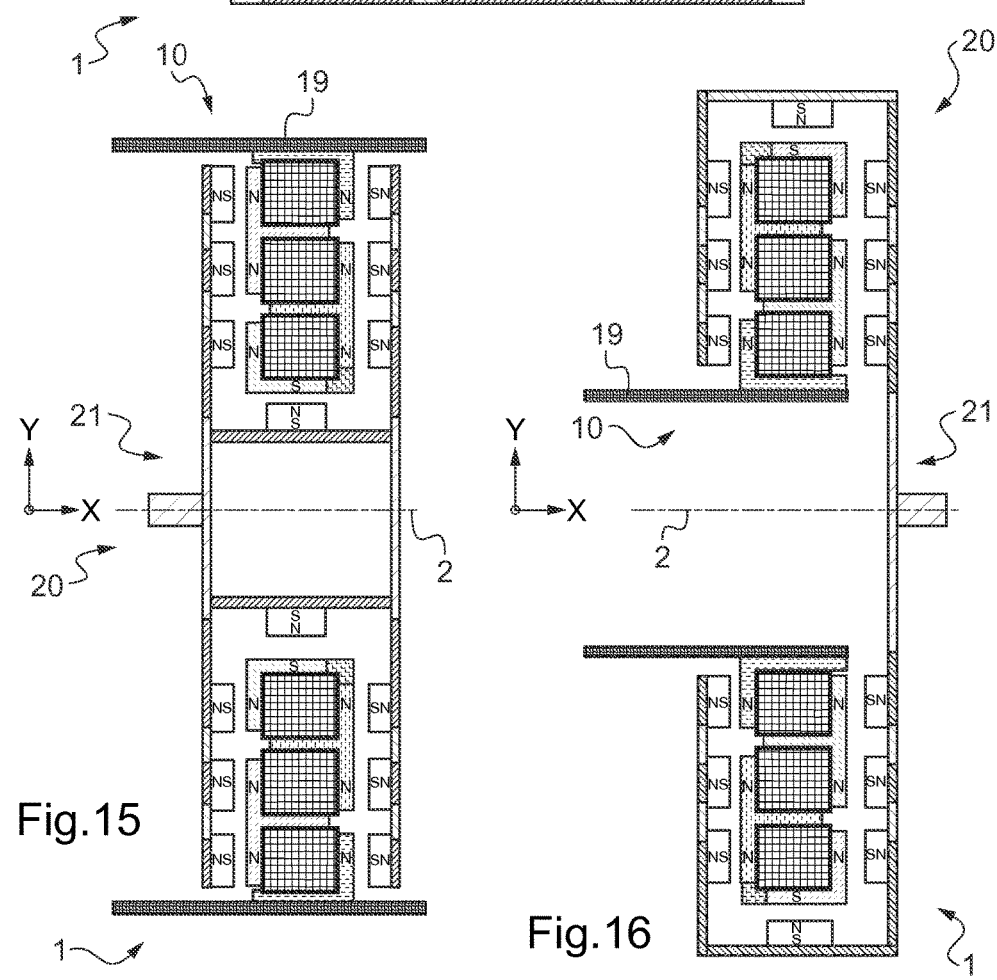
Fig.15
Fig.16

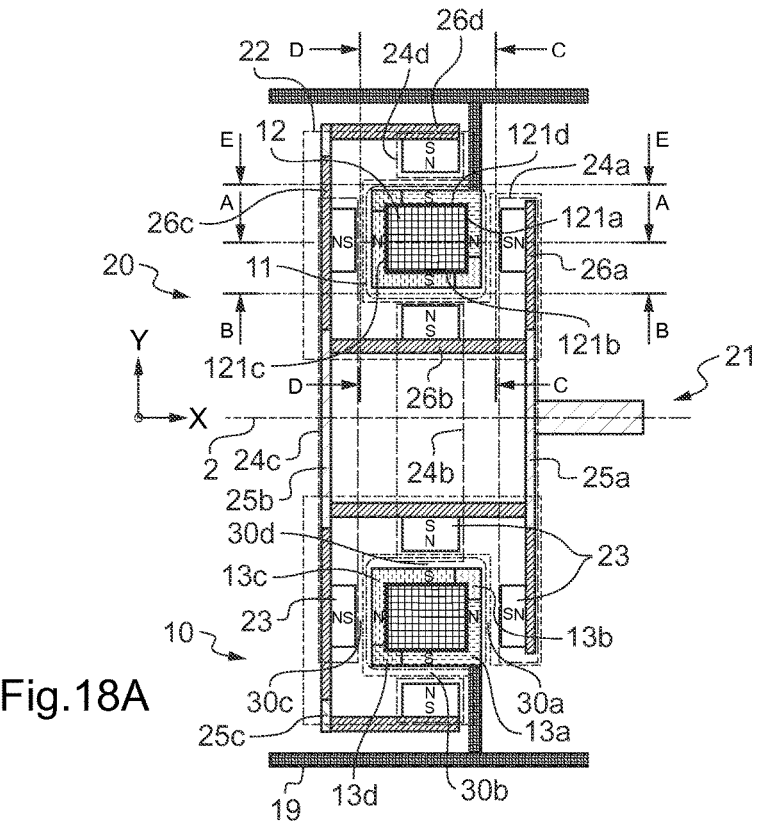
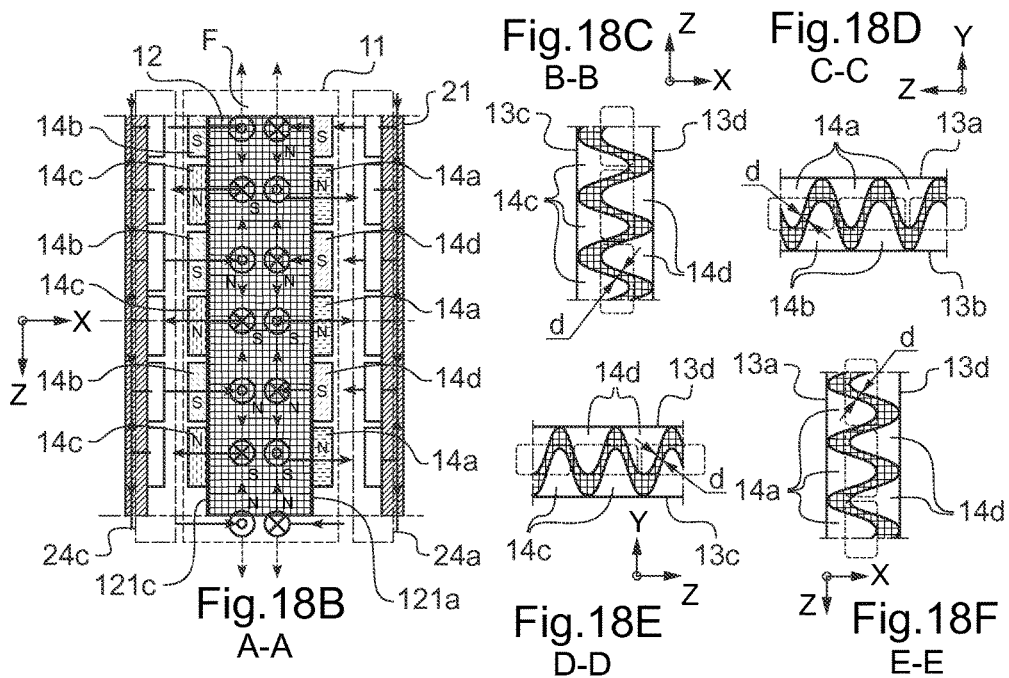
Fig.18A
Fig.18B A-A
Fig.18C B-B
Fig.18D C-C
Fig.18E D-D
Fig.18F E-E

ELECTRIC MACHINE WITH MULTIPLE AIR GAPS AND A 3D MAGNETIC FLUX

CROSS-REFERENCE TO RELATED APPLICATIONS

This application claims priority to French Patent Application No. FR 13 00029 filed Jan. 9, 2013, the disclosure of which is incorporated in its entirety by reference herein.

BACKGROUND OF THE INVENTION (1) Filed of the Invention

The present invention lies in the area of electric machines. It relates to a reversible electric machine with multiple air gaps and a 3D magnetic flux. Such an electric machine may be monophase or polyphase.

(2) Description of Related Art

An electric machine that converts electrical energy into mechanical energy—for example, for the propulsion of a vehicle—is called a "motor". An electric machine that converts mechanical energy into electrical energy—for example, for the generation of an electric current—is called a "generator". Among generators, a distinction can be drawn between alternators, which supply an alternating electric current, and dynamos, which supply a direct electric current.

An electric motor may be adapted in order to be fed by a direct electric current or by a monophase or polyphase alternating electric current, such as a three-phase electric current. Similarly, an alternator may be adapted to generate a monophase or polyphase alternating electric current.

However, a polyphase alternating electric current must be balanced in order to allow smooth and fluid operation of the electric machine. Such a balanced polyphase alternating electric current, thus forming a balanced electrical system, includes at least three phases and is characterized, in particular, by the fact that the sum of the complex voltages (or currents) of each phase is null, while the amplitude of the voltage (or current) of each phase is not simultaneously null. Moreover, an identical phase shift is present between each phase of this current.

An electric machine is said to be reversible when it can be simultaneously used as a motor and a generator. Any electric machine can be reversible, with the distinction between the motor and generator functions being made only with regard to the purpose and the use of this electric machine. The term "motor-generator" is also used if both functions are available on the electric machine.

The motors currently in use may be rotary (that is, producing angular displacement and/or torque) or linear (producing linear displacement and/or a force).

On the other hand, generators are essentially rotary.

A rotating electric machine is an electromechanical device that includes at least one stator that is fixed and at least one rotor that rotates with respect to the stator, and which can be located inside or outside the stator. The rotation of this rotor is generated by the interaction between two magnetic fields that are attached to this stator and the rotor respectively, thus creating a magnetic torque on the rotor. Thus, the phrases "stator magnetic field" and "rotor magnetic field" are used respectively.

Because the remainder of this description will be limited to rotating electric machines, for the sake of simplicity the term "electric machine" will be used to designate a rotating electric machine. Similarly, the term "electric motor" will designate a rotating electric motor, and the term "generator" will designate a rotating electric generator.

The various electric machine technologies are distinguished essentially by the way in which the stator and rotor magnetic fields are generated.

For example, in a direct-current electric motor, the stator includes magnetic elements, which may be permanent magnets or non-permanent magnets, more commonly known as electromagnets, and which typically consist of one or more windings of electric conductors supplied with a direct electric current. The term "coil" will be used in this document to designate a set of one or more windings of electric conductors. In both cases, each magnet includes two poles (a north pole and a south pole), and a fixed stator magnetic field is thus created. Conversely, the rotor includes non-permanent magnets consisting of a coil that creates a rotational magnetic field when a direct electric current passes through it. When this rotor rotates, a rotating collector makes it possible to reverse the direction of this direct electric current passing through the rotor coil at least once per rotation, thus reversing the poles of the non-permanent magnets of this rotor and thereby modifying the direction of the rotor magnetic field.

Thus, a shift between the stator and rotor magnetic fields causes a magnetic torque on the rotor, with, for example, a north pole of the stator repelling a north pole of the rotor and attracting a south pole of the rotor. Consequently, a rotation of the rotor with respect to the stator is generated.

A principal disadvantage of such a direct-current electric motor resides in the electrical contacts that are necessary between the rotor coil and the rotating collector. These contacts, which are obtained for example by means of brushes, can create electric arcs that in particular cause wear, and parasitic currents that consequently require frequent maintenance schedules for the electric machine. Furthermore, this type of electric motor is not suitable for high rotation speeds, and consumes energy due to friction, thereby reducing its performance. Finally, it can be complex to implement.

These disadvantages have been eliminated thanks to brushless-motor technology, also known as "brushless motors".

The rotor of such an electric machine includes one or more permanent magnets, while the stator includes a coil including non-permanent magnets. Such a machine may also include means for determining the position of the rotor (for example, through the use of a sensor), as well as an electronic control system that ensures the switching of the electric current. An alternating electric current then circulates within the stator coil. Thus, this electronic control system makes it possible to ensure the orientation and the direction of the stator magnetic field with respect to the rotor magnetic field, and consequently the rotation of the rotor with respect to the stator, with the rotating stator field engaging the rotor field.

Furthermore, within the stator coil, one or more windings may be grouped in order to form different stator phases, with each phase having an identical phase shift with respect to the other phases. In motor mode, each phase is fed by one phase of a polyphase alternating electric current and, respectively, generates a stator magnetic field, with each stator magnetic field that is associated with a phase likewise being shifted with respect to the other stator magnetic fields that are associated with the other phases. The stator magnetic fields, when they are derived from a single polyphase electric current forming a balanced electric system, add up to form a single stator magnetic field, known as a "stator resultant", which rotates at a synchronous frequency. This stator resultant then causes the rotation of the rotor field, and consequently creates a rotation of the rotor with respect to the stator.

Similarly, in generator mode, the rotation of the rotor causes the rotation of the rotor field and the creation of a rotating stator resultant, which is decomposed into one magnetic field for each phase of the stator, thus generating the appearance of a polyphase alternating electric current.

Among electric machines that use alternating electric current, a distinction can be drawn between synchronous and asynchronous electric machines.

Synchronous electric machines, which include brushless motors, have a rotor that includes one or more permanent magnets and a stator that includes a coil provided with multiple windings that may form one or several phases. In fact, when one or more of the alternating electric currents of a balanced polyphase electric system pass through them, the windings of the stator coil create one or more rotating stator magnetic fields, whose stator resultant engages the rotor magnetic field at the synchronous frequency of the machine, thereby causing the rotation of the rotor.

Conversely, a rotation of the rotor, generated by an external mechanical force, creates a rotation of the rotor magnetic field, which causes the creation of one or more rotating stator magnetic fields forming the stator resultant, and, consequently, the appearance and the circulation of one or more alternating electric currents in the stator coil.

The permanent rotor magnets may be replaced by a coil that is fed by a direct electric current, forming non-permanent magnets and thus creating a rotor magnetic field. The direct electric current may be delivered by an electric current generator, such as a battery or a capacitor.

The rotational frequency of the rotor of a synchronous electric motor is proportional to the frequency of the alternating electric current applied to the stator. Similarly, the frequency of the alternating electric current generated in a synchronous generator is proportional to the rotational frequency of the rotor. The synchronous machine is often used as a generator, for example, as an alternator in electric power stations.

Asynchronous electric machines have a rotor that includes a coil whose windings are short-circuited and a stator that includes a coil, forming non-permanent magnets. In fact, when an alternating electric current passes through this stator coil, it creates one or more rotating stator magnetic fields, whose stator resultant causes the appearance of a rotor electric current in the rotor coil, thereby generating a magnetic torque on this rotor and, consequently, the rotation of this rotor with respect to the stator.

Conversely, a rotation of the rotor generated by an external mechanical force will cause the appearance and the circulation of an alternating electric current in the stator coil. In order for this to occur, the electric machine must be connected to a network that includes, for example, at least one inverter and one battery, in order to supply it with the reactive energy that is necessary for its operation in generator mode.

Although the rotational frequency of the stator magnetic field is proportional to the frequency of the alternating electric current passing through the stator coil, the rotational frequency of the rotor of an asynchronous electric motor is not necessarily proportional to this frequency of the alternating electric current, because a slip rate may appear between the rotor and the stator magnetic field. Similarly, the frequency of the alternating electric current generated in an asynchronous generator is not necessarily proportional to the rotational frequency of the rotor.

For a long time, asynchronous machines were used only as electric motors, for example, in the transportation field, to drive ships and trains, as well as in the industrial area for machine tools. Thanks to the use of power electronics, such electric machines are also used today as generators—for example, in wind turbines.

Furthermore, the use of such reversible electric machines on board vehicles, such as automobiles or rotary-wing aircraft, is being developed for the implementation of a hybrid motor installation using two types of energy (both thermal and electrical) to drive the vehicle. However, the use of these electric machines today is limited by certain constraints, such as the power-to-weight ratio of the machines and of the electric-energy storage means.

Regardless of the type of reversible electric machine, a magnetic flux circulates between the rotor and the stator through the various permanent or non-permanent magnets of this rotor and of this stator, and this flux is channeled by the magnetic poles of these magnets. In fact, this magnetic flux circulates from a north pole to a south pole across the air gap located between each pole of the stator and of the rotor, as well as between a south pole and a north pole in the vicinity of the stator and of the rotor.

Furthermore, the rotor magnets—whether they are permanent or non-permanent, may be oriented in two ways, thus leading to at least three types of electric machines.

On the one hand, the magnets may be oriented perpendicular to the axis of rotation of the electric machine, that is, with the two poles of each magnet oriented perpendicular to this axis of rotation. These magnets are said to be radially oriented, or are simply referred to as radial magnets. A radial magnetic flux is thus created in the vicinity of these magnets, i.e., perpendicular to this axis of rotation. Thus, the air gap in the vicinity of these magnets is arranged to lie parallel to this axis of rotation.

On the other hand, the magnets may be oriented parallel to the axis of rotation of the electric machine—that is, with the two poles of each magnet oriented parallel to this axis of rotation. These magnets are said to be axially oriented, or are simply referred to as axial magnets. An axial magnetic flux is thus created in the vicinity of these magnets, i.e., parallel to this axis of rotation. Thus, the air gap in the vicinity of these magnets is located perpendicular to this axis of rotation.

These various orientations of the magnets make it possible to orient the magnetic flux that circulates inside the electric machine, which, in a first type of electric machine (for example, a disc-rotor electric machine) is axial; or, in a second type of electric machine (for example, a cylindrical-rotor electric machine), is radial. For a third type of electric machine, both radial and axial magnets may be used in the same electric machine, such that a magnetic flux is created that is simultaneously radial and axial. This type of magnetic flux is referred to as a "multiple air-gap magnetic flux". Conversely, regardless of the orientation of the magnets, a single magnetic flux circulates throughout the electric machine.

Contemporary electric machines use various configurations and orientations of the magnetic flux, that is, a radial or axial magnetic flux, in order better to meet the customer's needs, in terms of both performance and dimensions. For example, machines with permanent magnets and a strongly coupled axial flux are shorter axially and larger radially, whereas machines with a radial flux are small radially and long axially.

Furthermore, the power-to-weight ratio of these electric machines—namely, the ratio of their power to their mass— and their manufacturing cost will vary depending on the magnetic-flux configurations that are used, without necessarily being optimal.

Electric machines with prongs and permanent magnets are the most desirable type today, thanks to a high performance/cost ratio in comparison with other machine technologies, particularly because of the use of permanent magnets; the use of a soft, pressed and baked magnetic alloy (i.e., a soft magnetic compound) instead of the assembly of laminated sheets; and the use of axial coils, as well as because they involve a limited number of parts. The use of a soft, pressed and baked magnetic alloy, which notably possesses isotropic characteristics in all three directions, enables the manufacture of complex three-dimensional shapes. However, the power-to-weight ratio is not optimal, because these electric machines use only one orientation of the magnetic flux created from the magnetic field generated by the stator operating in motor mode. In fact, this magnetic flux circulates essentially radially or axially with respect to the axis of the machine. Thus, using this technology, in order to have high torque machines it would be necessary to increase either the radius (for radial machines) or the length (for axial machines) of the air gap, which would result in large and heavy machines. Thus, this technology does not use all of the possibilities for the orientation of the magnetic flux, and does not allow the creation of high torque electric machines that are also compact and light.

The prior art also includes document EP 0613229, which describes a direct-current brushless motor that includes a stator and a rotor. The rotor consists of a circular rotor yoke provided with multiple magnetic poles whose north poles and south poles are arranged in alternation.

The stator includes two assembled circular stator yokes, within which a coil is located. Each stator yoke includes bent tabs, with one bent tab of each stator yoke located alternately opposite a magnetic pole of the rotor yoke, thus forming an air gap. Furthermore, when an alternating electric current passes through the coil, the coil magnetizes the bent tabs of each stator yoke, alternately forming a north pole and a south pole. Thus, these different magnetic poles, which are present on the stator and the rotor, make it possible to generate a rotational motion of the rotor. This document describes various ways of ensuring accurate and stable angular positions between the two stator yokes.

Meanwhile, FR 2828027 describes a machine with a homopolar structure that includes a stator and a rotor. The stator includes one or more circular yokes, each of which consists of two identical, angularly indexed crowns, inside of which a coil is located. Each crown includes bent tabs that alternately form a north pole and a south pole when an electric current passes through the coil. When the stator includes multiple yokes, these yokes are separated by a spacer made of a non-magnetic material. Furthermore, in a polyphase motor, each coil may be connected to a different phase.

Meanwhile, EP 1770846 describes an electric machine with a radial flux that includes a stator and a rotor. The rotor includes permanent magnets, while the stator includes one or more circular yokes, each of which consists of two identical, angularly indexed crowns, inside of which a coil is located. Each crown is made of a magnetic powder that is compacted along the direction of the axis of rotation of the crown, and includes prongs that alternately form a north pole and a south pole when an electric current passes through the coil. Three yokes that are phase shifted by 120° are assembled and insulated by an insulating resin, such that a stator for a three-phase electric machine is formed.

Moreover, WO 2004/107541 describes a transverse-flux electric machine that includes a stator and a rotor. The stator includes a coil and two circular yokes located at each end of this coil. Each yoke includes C shaped tabs that are bent on the circumferential face of the coil, along with a multitude of conductive parts located on this circumferential face and distributed uniformly between the C shaped tabs, thus forming several rows along the axial direction of the electric machine. The rotor includes a multitude of magnets that are likewise arranged in several rows along the axial direction of the electric machine, thereby facing each C shaped tab and each conductive part of the stator, forming an air gap with them. When an alternating electric current passes through the coil, the C shaped tabs and the conductive parts are magnetized, and a magnetic flux then circulates radially between the rotor magnets, on the one hand, and the C shaped tabs and the conductive parts of the stator, on the other hand, thereby generating a rotational movement of the rotor.

The prior art also includes CN 101212150, which describes a dual-air-gap electric machine that includes a stator and a rotor. The rotor includes two groups of magnets, with one group being positioned radially and the other group being positioned axially facing the axis of rotation of the electric machine. Similarly, the stator includes a coil and two groups of magnetic poles, with one group being positioned facing radial magnets of the rotor, thereby creating a radial magnetic flux, and with the other group being positioned facing axial magnets of the rotor, thereby creating an axial magnetic flux. In fact, a dual air gap that is both radial and axial is created between the rotor and the stator. The magnetic poles of the stator and of the rotor consist of circumferentially alternating north and south poles. Conversely, an adjacent radial pole and an adjacent axial pole are identical. Thus, the magnetic flux that circulates in the electric machine can divide, in order to pass radially and axially through the dual air gap and circulate between the poles of the stator and of the rotor, then recombine in the vicinity of the stator and of the rotor.

Lastly, FR 2961037 and FR 2959621 relate to a homopolar electric machine that includes a rotor and a stator that has one or more phases. The rotor includes multiple permanent magnets, and each phase of the stator consists of a coil and a yoke provided with alternating magnetic poles, with each yoke being formed by two crowns. More specifically, FR 2961037 describes the shape of the teeth carried by each crown, with each crown forming each magnetic pole of the stator, thereby enabling the optimization of the circulation of the magnetic flux. In fact, such a tooth shape allows the magnetic flux to circulate maximally in the magnetic circuit, which consists, among other things, of the stator yoke, thereby limiting both its circulation in air and magnetic leakage. Meanwhile, document FR 2959621 describes how to perform the angular indexing of the yokes constituting each phase of this homopolar electric machine, by using an intermediate disk located between each yoke. Each intermediate disk includes index fingers that cooperate with holes located in each yoke, in order to ensure the angular offset corresponding to each phase.

BRIEF SUMMARY OF THE INVENTION

Thus, the goal of the present invention is to offer an electric machine that makes it possible to overcome the above-mentioned limitations, in order to improve the use of the magnetic field that is generated in the vicinity of the stator, thereby enhancing the performance of such an electric machine, including, in particular, its power-to-weight ratio, thanks to the presence of at least two air gaps and the circulation of a magnetic flux in three dimensions.

According to the invention, an electric machine includes an axis of rotation, a stator equipped with an armature and at least one annular exciter unit, as well as a rotor revolving about the axis of rotation and equipped with a structure and at least one annular receiver unit. The rotor may be internal and/or external with respect to the stator—that is, such that the rotor turns inside or outside the stator, but one part of the rotor may also turn inside the stator while another part of the rotor turns outside the stator. Each exciter unit includes a coil and at least two annular yokes, with this coil being positioned inside the yokes and having at least two faces, and with these yokes including a plurality of teeth. Each receiver unit includes a plurality of magnets and cooperates with a single exciter unit, with each magnet having a first north pole and a first south pole. The total number of magnets is equal to the total number of teeth present in the yokes.

Each exciter unit and each receiver unit have an annular shape around about the axis of rotation of the electric machine. Each yoke also has an annual shape about this axis of rotation, so that the set of yokes encloses the coil of each exciter unit.

This coil may be composed of one or more windings of electrical conductors. When an electric current passes through this coil, the teeth of each yoke are magnetized to form second north and south magnetic poles.

The yokes, as well as the rotor structure, primarily in the areas in which the magnets are located, are made of a ferromagnetic material that allows the magnetic flux to be conducted with no Foucault current losses. For example, the yokes may be made of a soft magnetic steel alloy in powder form that is pressed and baked and/or machined. They may also be made of stacked steel sheets or assembled steel pieces.

The armature of the stator is made of a non-magnetic material such as aluminum, fiberglass, or carbon fiber, resin, or plastic. Such materials do not conduct the magnetic flux, and therefore prevent magnetic-flux short circuits and, consequently, magnetic leakage.

This electric machine is noteworthy in that each yoke includes at least two sides, two of which are extreme sides, and the teeth of each yoke are distributed on these two extreme sides and angularly, in a regular manner, about the axis of rotation on each extreme side. These two extreme sides constitute the two ends of the yoke, with other optional sides, referred to henceforth as "intermediate sides", being located between these two extreme sides. Furthermore, the teeth of two adjacent yokes are fitted into each other on one of the faces of the coil, while maintaining a distance between them, alternately forming second north poles and second south poles. This distance between each tooth is sufficient to maintain magnetic isolation, so as to avoid a magnetic short circuit between the teeth, thereby making it possible to limit or even eliminate magnetic flux leakage from one tooth to another.

Each receiver unit includes at least two rows of magnets, with each magnet having a first pole located facing the exciter unit, and, more specifically, facing one of the faces of the coil onto which the teeth are fitted, and the other first pole is located facing the rotor structure. Each row consists of an alternation of the first north poles and the first south poles, and is located facing the exciter unit. The magnets are distributed angularly in a regular manner about the axis of rotation of the rotor.

Furthermore, inside a receiver unit, each row of magnets is linked, either directly or by means of a ferromagnetic material, to the rotor structure, which itself is made of a ferromagnetic material. Moreover, each row of magnets of a receiver unit may be isolated magnetically from the other rows of magnets of this receiver unit in order to prevent magnetic leakage in particular. For example, such magnetic isolation may be achieved by means of a non-magnetic material.

Thus, an air gap is formed between each row of magnets and the exciter unit, and the magnetic flux circulating inside the electric machine can divide and recombine itself in the vicinity of each magnet in a single given row of the rotor and of each stator yoke.

In fact, depending on the number of yokes enclosing the coil of the exciter unit (which number is preferably from two to four), and on the way in which these yokes enclose this coil, the yokes may include two, three, or four sides, two of which are extreme sides, with the optional presence of one or two intermediate sides. The teeth of each yoke are distributed on these two extreme sides. Furthermore, in order to enclose the coil, two extreme sides of two adjacent yokes are positioned head-to-tail on one face of the coil, with the teeth fitting into each other while maintaining a distance between themselves.

Furthermore, when an electric current passes through the coil, each tooth is magnetized in order to alternately form a second north pole and a second south pole for two adjacent yokes on the faces of the coil.

Thus, a yoke includes teeth on its two extreme sides, with these teeth being capable of being distributed in different ways between these two extreme sides.

According to a first yoke geometry, the teeth of the two extreme sides of a yoke are distributed angularly in a regular manner about the axis of rotation and in alternation on the two extreme sides. Thus, each tooth of an extreme side is located between two teeth of the other extreme side of this yoke, with the two extreme sides having, for example, shapes that are equivalent to two signals of opposite phase.

According to a second yoke geometry, the teeth of the two extreme sides of a yoke are positioned face to face, with the two extreme sides thus having shapes that are equivalent to two in-phase signals.

In addition to these two specific yoke geometries, the teeth of one extreme side of a yoke may also occupy any of the intermediate positions between a position face-to-face with a tooth of the other extreme side and a position between two teeth of the other extreme side. That is, the teeth may have any offset between a tooth of one extreme side and a tooth of the other extreme side. Conversely, these teeth must always have the same offset between a tooth of one extreme side and a tooth of the other extreme side of each yoke, as well as the same shape and the same dimensions.

Moreover, the teeth of each yoke may cover, to a greater or lesser extent, each face of the coil.

According to a first coverage pattern, the extremity of each tooth does not extend beyond the face of the coil. That is, the teeth stop in front of the yoke with which they fit. Furthermore, each intermediate side of the yoke (when the yoke has one) extends beyond the face of the coil on which it is located.

Conversely, according to a second coverage pattern, the extremity of each tooth extends beyond the face of the coil. That is, the teeth extend as far as the outer face of the yoke with which they fit. Furthermore, each intermediate side of the yoke (when the yoke has one) does not extend beyond the face of the coil on which it is located.

This second coverage pattern advantageously makes it possible to have a larger tooth surface and, consequently, a larger air gap. Accordingly, the torque and the power-to-weight ratio of the electric machine according to the invention are greater for identical dimensions of the electric machine.

Furthermore, the magnets of each receiver unit are distributed in such a way that their first poles cooperate with the corresponding second poles of an exciter unit. For this purpose, these magnets are distributed over at least two rows of magnets, with each row being located facing one of the faces upon which the teeth of the yokes are fitted.

Each row of magnets consists of an alternation of the first north poles and of the first south poles, with each first pole being located facing one tooth of a yoke. Consequently, an air gap is formed between each row of magnets and the exciter unit.

Indeed, this specific distribution of the first poles on each receiver unit of the rotor, and of the second poles of the yokes of the stator, as well as the respective positions of the poles with respect to at least two faces of the coil of each exciter unit, allow this electric machine according to the invention to operate in a particular way.

In fact, a magnetic flux circulates from a north pole to a south pole, doing so through the air gap between the stator and the rotor, whereas this magnetic flux circulates from a south pole to a north pole in the stator and the rotor. Furthermore, the alternation of the second magnetic poles and the fitting-together of the yokes make it necessary to have two adjacent first teeth on a given extreme side having the same polarity, with the two extreme sides of a yoke thus having opposite polarities.

Thereafter, the magnetic flux circulating in the electric machine can divide in each yoke after a second south pole, moving from at least two second south poles of each yoke toward at least two second north poles, and recombining before reaching a second north pole of this yoke.

Similarly, in the rotor, the magnetic flux may divide after each magnet of this rotor, moving from at least two magnets of this rotor toward at least two other magnets of this rotor, and recombining before reaching each magnet of the rotor.

For example, according to the first yoke geometry, one tooth of an extreme side, corresponding to a second south pole, is located between two teeth of the other extreme side of this yoke, corresponding to two second north poles. That is, the one tooth is equidistant from the two nearest second north poles.

Thus, the magnetic flux circulating in the electric machine has a tendency, after this second south pole of the yoke, to divide primarily and equivalently, between these two nearest second north poles. A small part of this magnetic flux may also move toward other second north poles of this yoke.

Then, before reaching each second north pole of each yoke, this magnetic flux recombines, coming primarily and in an equivalent manner from two second south poles of this yoke.

In the case of the second yoke geometry, a tooth of an extreme side, corresponding to a second south pole, is located facing a tooth of the other extreme side, corresponding to a second north pole. That is, the tooth is located near a single second north pole, with two second north poles thus being equidistant from this second south pole, but at a greater distance from it.

Thus, the magnetic flux circulating in the electric machine has a tendency, after this second south pole of the yoke, to move primarily toward this nearest second north pole. However, this magnetic flux may also divide, and part of this magnetic flux may move toward other second north poles of this yoke, and particularly toward the two second north poles enclosing the second north pole located facing the second south pole from which the magnetic flux is coming.

Then, before reaching each second north pole, this magnetic flux recombines, primarily when coming from this second south pole that is nearest to this second north pole, and optionally, when coming from two second south poles of this yoke enclosing this second south pole.

Lastly, in the other intermediate yoke geometries between the two specific geometries, a tooth of an extreme side of a yoke, corresponding to a second south pole, is always closer to a single tooth of the other extreme side, corresponding to a second north pole, with another tooth, corresponding to another second north pole, optionally being present at a slightly greater distance.

Indeed, the magnetic flux circulating in the electric machine has a tendency, beyond this second south pole of the yoke, to move primarily toward this nearest second north pole. However, this magnetic flux may also divide, and a more or less sizable portion of this magnetic flux may move toward one or more other second north poles of this yoke.

Then, upon reaching each second north pole, this magnetic flux recombines, primarily when coming from this second south pole that is nearest to this second north pole, and, optionally, when coming from one or more other second south poles of this yoke.

In the vicinity of the rotor, the magnetic flux circulates over a single row of magnets, without a direct exchange with other rows. Indeed, regardless of the yoke geometry, because the magnets are distributed angularly, in a regular manner, about the axis of rotation of the rotor, the magnetic flux circulates in an identical manner inside the rotor. Thus, after having passed from the stator and through a first magnet of the rotor, the magnetic flux is divided primarily and equivalently between two magnets located on either side of this first magnet. However, a small portion of this magnetic flux may also move toward other magnets in this row on the rotor.

Then, before passing through an air gap toward the stator, this magnetic flux is recombined upon arrival at each magnet, coming primarily and equivalently from two magnets of this rotor.

Furthermore, each yoke, whose teeth are distributed over at least two faces of the coil of an exciter unit, permit the magnetic flux to circulate from one face of the coil to another face of this coil—that is, from at least one second south pole to at least one second north pole of a yoke, and then from one row of magnets of a receiver unit toward another row of magnets of this same receiver unit. Indeed, this magnetic flux, which circulates over at least two faces of the coil of each exciter unit, can be thought of as having a three-dimensional path. Thus, one can speak of a "3D magnetic flux" circulating in the electric machine according to the invention.

Advantageously, distributing the teeth of each yoke over at least two faces of the coil of each exciter unit makes it possible to increase the number of second magnetic poles attached to this exciter unit, while preserving the same coil, for the same air-gap diameter and the same space requirement. Similarly, increasing the number of yokes (that is, using at least two yokes) likewise makes it possible to increase the number of second magnetic poles attached to this exciter unit.

Accordingly, the electric machine according to the invention makes it possible to optimize the use of the magnetic field generated in the vicinity of each exciter unit by multiplying the number of second poles, and thus increasing the surface area and the number of air gaps, or even using it in an optimal manner by means of four yokes, with corresponding teeth being located on the four faces of the coil.

Thus, the multiplicity of the number of second magnetic poles for each exciter unit and of the number of first magnetic poles for each receiver unit, and the increase in the number of air gaps and the circulation of a 3D magnetic flux, make it possible to enhance the performance of the electric machine according to the invention, while preserving an equivalent volume and mass, and without making its management more complex.

Thus, the performance of such an electric machine—including, in particular, its torque—is improved, and its power-to-weight ratio is noticeably increased. In fact, when the number of magnetic poles of each exciter unit is multiplied by two, three, or four, the torque of the electric machine is likewise multiplied by two, three, or four, while its dimensions remain unchanged, with only its mass undergoing a slight increase due to the presence of the additional magnetic poles. Indeed, the power of such an electric machine is significantly increased in exchange for a slight increase in its mass, such that its power-to-weight ratio is noticeably increased.

According to a first embodiment of the invention, each exciter unit includes two yokes, and the two extreme sides of these two yokes are positioned head-to-tail on two faces of the coil.

Furthermore, each receiver unit includes two rows of magnets, such that two air gaps are thus formed between each receiver unit and each exciter unit.

According to this first embodiment, the teeth of the two yokes fit into each other, and the two yokes have the same geometry—that is, both of the yokes are implemented, for example, according to the first geometry or the second geometry. In general, both of the yokes have the same offset between each tooth of one extreme side and each tooth of the other extreme side.

Furthermore, both of the yokes are identical in the case in which the teeth of the two yokes fit into each other on two opposing faces of the coil.

According to a second embodiment of the invention, each exciter unit includes three yokes, and the two extreme sides of these three yokes are positioned head-to-tail on three faces of the coil.

Furthermore, each receiver unit includes three rows of magnets, such that three air gaps are thus formed between each receiver unit and each exciter unit.

According to this second embodiment, each exciter unit may include, for example, three yokes according to the first geometry, or else one yoke according to the first geometry and two yokes according to the second geometry. However, other yoke geometries may be associated in this second embodiment of the invention.

According to a third embodiment of the invention, each exciter unit includes four yokes, and the two extreme sides of these four yokes are positioned head-to-tail on four faces of the coil.

Furthermore, each receiver unit includes four rows of magnets, such that four air gaps are thus formed between each receiver unit and each exciter unit.

According to this third embodiment, each exciter unit may include, for example, four yokes according to the first geometry, four yokes according to the second geometry, or else two yokes according to the first geometry and two yokes according to the second geometry. However, other yoke geometries may be associated in this third embodiment of the invention.

Each yoke is usually composed of a single annular piece. However, when a yoke does not have an intermediate side and the teeth are arranged according to the second coverage pattern, this yoke may be composed of a plurality of pairs of teeth, with one tooth in the pair being located on each extreme side. In particular, when a yoke implements the second geometry, both of the teeth in this pair of teeth are located face to face, respectively, on each extreme side. Thus, these pairs of teeth are not linked to each other, and therefore are magnetically isolated from each other. Similarly, the teeth of the yoke that are located on the same extreme side are also isolated from each other. In this case, the 3D magnetic flux circulates only through this pair of teeth, from one tooth on an extreme side to the tooth on the other extreme side. Thus, this 3D magnetic flux cannot divide and recombine on this yoke. Conversely, this 3D magnetic flux can always divide and recombine in the vicinity of the magnets of the rotor, and, optionally, may also do so in the vicinity of one or more yokes that include at least one intermediate side.

The magnets of each receiver unit are preferably permanent magnets. In fact, they do not require any power, and have a substantial power-to-weight ratio. However, the magnets of each receiver unit may be non-permanent magnets. For example, they may consist of a coil to which direct current is supplied, or else may consist of a short-circuit coil.

Thus, an electric machine according to the invention may constitute, particularly as a function of this choice for the magnets of each receiver unit, a synchronous or asynchronous electric machine.

Moreover, the two extreme sides of each yoke may be positioned perpendicular to the axis of rotation of the electric machine, thus cooperating with axial magnets so as to create an axial 3D magnetic flux in the air gaps. These two extreme sides may also be positioned parallel to this axis of rotation, thus cooperating with radial magnets so as to create a radial 3D magnetic flux in the air gaps.

A yoke may also have one extreme side positioned perpendicular to the axis of rotation of the electric machine, and one extreme side positioned parallel to this axis of rotation, cooperating respectively with axial and radial magnets, with the 3D magnetic flux thus traveling in the air gaps in a multi-air-gap manner, namely, both axially and radially.

Indeed, when an exciter unit includes at least three yokes, the 3D magnetic flux circulates in a multi-air-gap manner in the electric machine according to the invention.

Conversely, when an exciter unit includes only two yokes, the 3D magnetic flux may circulate axially, radially, or in a multi-air-gap manner. In fact, if the two extreme sides of each yoke are located on two opposite faces of the coil of the exciter unit, the 3D magnetic flux will circulate either axially or radially, depending on whether these faces are perpendicular or parallel to the axis of rotation. Conversely, if the two extreme sides of each yoke are located on two adjacent services of the coil of the exciter unit, the 3D magnetic flux will then circulate in a multi-air-gap manner in the electric machine.

This choice of an axial, radial, or multi-air-gap 3D magnetic flux affects the dimensions of the electric machine and therefore may be made for reasons, among others, involving the dimensional criteria of the electric machine. This choice may also affect the inertia of the rotor, and thus the rotational speeds of the electric machine.

In order to improve the performance of the electric machine according to the invention, including, in particular, its torque, multiple exciter units may be associated on the stator, in which case the rotor will include an equivalent association of receiver units, so that one receiver unit of the rotor cooperates with just one exciter unit of the stator.

The exciter units may be associated axially in relation to the axis of rotation of the electric machine, such that the exciter units form a line that is parallel to this axis of rotation. Similarly, the exciter units may be associated radially in relation to the axis of rotation of the electric machine, such that the exciter units form a line that is perpendicular to this axis of rotation. Lastly, these two association options may be combined so as to obtain, for example, subassemblies of axially associated exciter units. These subassemblies may also be combined radially.

Furthermore, identical exciter units (that is, exciter units that include the same number of yokes) may be associated. However, different exciter units (that is, exciter units that include different numbers of yokes) may similarly be associated. The important thing is that one exciter unit cooperates with one receiver unit whose number of rows of magnets corresponds to the number of yokes of this exciter unit.

Conversely, magnetic leakage may occur between each pair formed by an exciter unit and a receiver unit. These magnetic leakage cause a reduction in the performance of the electric machine, particularly in its torque.

In order to avoid these magnetic leakage, each pair consisting of an exciter unit and a receiver unit must be magnetically isolated, for example, by means of a non-magnetic material. In fact, the use of a non-magnetic material separating each exciter unit or each receiver unit is sufficient to isolate the 3D magnetic flux of each pair consisting of an exciter unit and a receiver unit, and to limit the risk of magnetic leakage.

Furthermore, in order to reduce the dimensions of such an electric machine, as well as its number of components, multiple exciter units can be associated, with each exciter unit being separated only by a yoke. This yoke is then used jointly by two exciter units. However, this architecture of the electric machine is possible only with the first coverage pattern of the teeth on each face of the coil, in which the extremity of each tooth does not extend beyond the face of the coil. In this case, the receiver units may be magnetically isolated in order to avoid, in particular, magnetic leakage, and in order to allow loop-type circulation of the magnetic flux between one exciter unit and one receiver unit. Consequently, because the magnetic leakage is limited, the power-to-weight ratio of the electric machine is optimized.

Conversely, the second coverage pattern of the teeth on the faces of the coil makes such an architecture impossible without the presence of significant and unacceptable magnetic leakage between the pairs consisting of one exciter unit and one receiver unit.

In motor operating mode, the set of exciter units of such an electric machine may be powered by a single monophase electric current.

Similarly, in generator operating mode, such an electric machine then provides a monophase electric current.

It is also possible to power one or more of these exciter units using different phases of a balanced polyphase electric current. In this case, each phase of the balanced polyphase electric current is shifted in relation to the other phases of this current. A shift must also be present within the electric machine according to the invention between the different receiver units. This shift between the receiver units is, in a known manner, a function of the shift between the phases of the balanced polyphase electric current and the number of magnetic poles of each receiver unit.

Similarly, in generator operating mode, such an electric machine then provides a balanced polyphase electric current.

In order to optimize the performance of the electric machine according to the invention, it is important to facilitate the movement of the 3D magnetic flux, not only when it passes through each air gap but also when it circulates in the rotor and stator.

In fact, the shape of each yoke is important, not only in terms of the teeth but also in terms of the connection between the teeth. First of all, the teeth may have a variety of different shapes, such as a triangle, trapezoid, or a rectangle. The optimal shape, which allows, on the one hand, good magnetization of the teeth by the exciter unit so as to form the second magnetic poles, and, on the other hand, good transfer of the 3D magnetic flux through each air gap toward the first poles of the rotor, is a so called "wave", which in fact corresponds to a regular sine wave. However, this shape is difficult to implement, particularly through the use of a manufacturing method, such as steel-powder compaction, that is typically employed for such parts of electric machines. In fact, the peaks of the waves lack homogeneity, and their effectiveness is reduced.

The teeth will preferably have a flat "cat's-tongue" shape, or else a so called "stairway" shape, which makes it possible to achieve a good compromise between the effectiveness of these shapes and their manufacture, particularly via steel-powder compaction.

Next, in order to allow good circulation of the 3D magnetic flux in each yoke, it is important not to have any areas of saturation of this 3D magnetic flux, especially at the base of each tooth. For this purpose, a connecting fillet can be added at the base of the tooth, in the vicinity of the joint between the extreme side and the next side of this yoke; or else the cross-sections of the yoke in this area can be modified. A connection in the form of a chamfer is preferably created at the base of each tooth.

The distance between the teeth of two adjacent yokes is equally important, in order to maintain a space, and thus a certain amount of magnetic isolation, between these teeth, thereby limiting the risks of a magnetic short-circuit and any resulting magnetic leakage. This distance is preferably constant and identical between each yoke on each face of the coil of the exciter unit.

Furthermore, the rotor structure is made of a material that is ferromagnetic primarily in the areas in which the rows of magnets are located, so as to allow the circulation of the magnetic flux between each magnet. Indeed, the parts of the structure where no rows of magnets are located may be made of a non-magnetic material.

Furthermore, certain parts of the structure may allow the magnetic isolation, on the one hand, of each row of magnets of a receiver unit in relation to the other rows of magnets of this receiver unit, and, on the other hand, of each receiver unit in relation to the other receiver units of the electric machine. For example, such magnetic isolation may be achieved by means of a non-magnetic material.

Advantageously, the non-magnetic materials typically have a lower density than the ferromagnetic materials. Indeed, the use of a non-magnetic material makes it possible to reduce the weight of the rotor of the electric machine, and, consequently, its moment of inertia, thereby contributing toward an improvement in the performance of the electric machine according to the invention.

BRIEF DESCRIPTION OF THE SEVERAL VIEWS OF THE DRAWINGS

The invention and the advantages associated with it will appear in greater detail in the following description that includes implementations provided solely as illustrative examples with reference to the attached figures, which are described as follows.

FIGS. 1A to 1D show various views of a first embodiment of the electric machine according to the invention;

FIGS. 3A to 3H and 4A to 4D show the possible shapes of the yokes;

FIGS. 5A to 5D and 6 to 10 show variants of this first embodiment;

FIGS. 11A to 11E show various views of a second embodiment of the electric machine according to the invention;

FIGS. 13 to 17 show variants of this second embodiment;

FIGS. 18A to 18F show various views of a third embodiment of the electric machine according to the invention;

DETAILED DESCRIPTION OF THE INVENTION

Figure 2A:
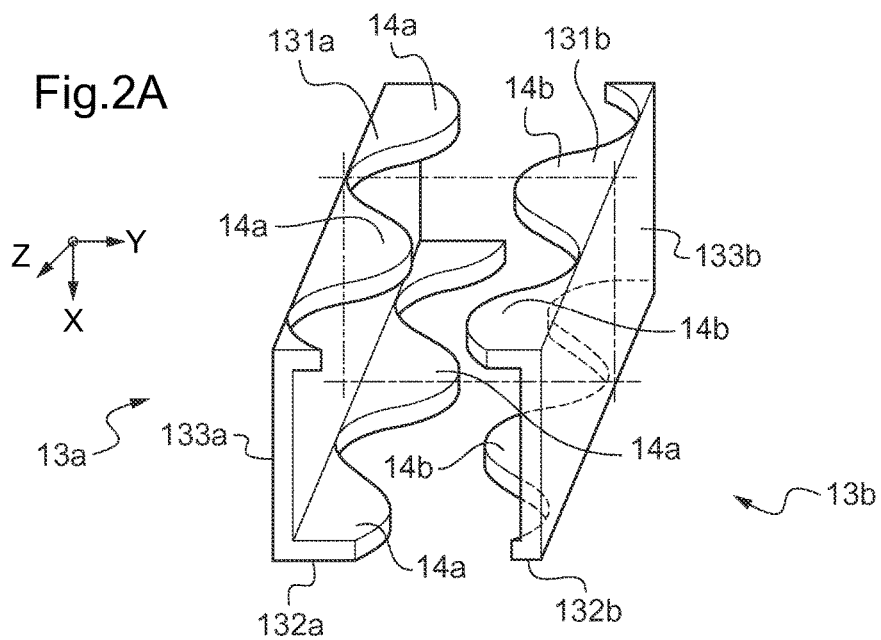
FIGS. 2A to 2C show various views of the yokes of this first embodiment.

Elements shown in a number of different figures are indicated by the same reference number.

It should be noted that three mutually orthogonal directions, X, Y, and Z, are shown in certain figures.

The first direction X is called the axial direction. The term "axial" applies to any direction that is parallel to the first direction X.

Directions Y and Z are called radial directions. The term "radial" applies to any direction that is perpendicular to the first direction X.

FIG. 1 shows a first embodiment of an electric machine 1 that relates to the invention. According to FIG. 1A, such an electric machine 1 includes an axis of rotation 2, a stator 10 and a rotor 20 that revolves about the axis of rotation 2 and inside the stator 10.

The rotor 20 includes a structure 21 and an annular receiver unit 22 that is provided with two rows 24a, 24b of magnets 23, each magnet 23 having a first north pole and a first south pole. Each row 24a, 24b thereby consists of alternating first north poles and first south poles.

This structure 21 of the rotor 20 includes two first parts 26a, 26b on which the two rows 24a, 24b of magnets 23 are respectively positioned, and a second part 25 that notably allows the fastening of these two first parts 26a, 26b.

The stator 10 includes an armature 19 and an annular exciter unit 11 that is equipped with a coil 12 and two identical annular yokes 13a, 13b. One portion of these yokes 13 is shown in FIG. 2A. Each yoke 13 includes three sides, of which two are extreme sides 131, 132 and one is the intermediate side 133, with each extreme side 131, 132 includes a plurality of teeth 14 that are distributed angularly in a regular manner about the axis of rotation 2. The coil 12 is located inside the two yokes 13a, 13b in order to form an exciter unit 11.

The armature 19 of the stator 10 as well as the second part 25 of the structure 21 of the rotor 20 are implemented as a non-magnetic material. For example, they can be made of aluminum. The yokes 13 as well as the first parts 26a, 26b of the structure 21 are made of a ferromagnetic material, a soft magnetic alloy, pressed and baked and/or machined (Soft Magnetic Compound), for example. The yokes 13 can be supported around the coil 12 by a non-metallic and non-magnetic material, for example by a solid carbon fiber coating. The two first parts 26a, 26b of this structure 21 are isolated magnetically from one another by the second part 25 of this structure 21. Use of the second part 25 of the structure 21, which is made from a non-magnetic material, notably allows for a reduction in the mass of the rotor 20, and consequently its moment of inertia.

The teeth 14 of the two yokes 13 mesh with one another on two faces 121a, 121b of the coil 12 to maintain a constant distance d between themselves, as is shown in FIGS. 1C and 1D. These two figures show the two sections B-B and C-C respectively according to the two faces 121a, 121b.

Figure 2B:
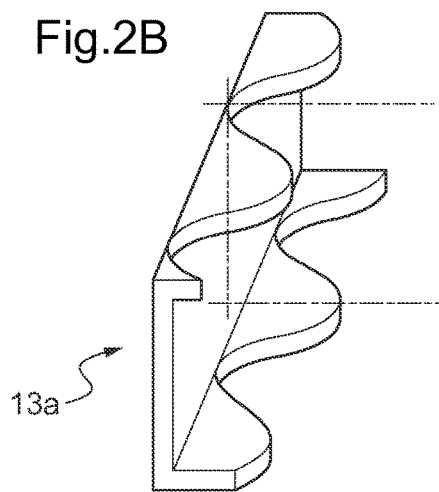

Each tooth 14 of an extreme side 131 of a yoke 13 is situated between two teeth 14 of the other extreme side 132 of this yoke 13 according to a first yoke geometry 13. The two extreme sides 131, 132, for example, have shapes that are equivalent to two signals opposite in phase, as shown in FIG. 2B.

However, these teeth 14 can be distributed differently between the two extreme sides 131,132, but teeth 14 must always have the same angular distribution about the axis of rotation 2 of the rotor 20 on each extreme side 131, 132 of each yoke 13, as well as the same shape and the same dimensions.

Figure 2C:
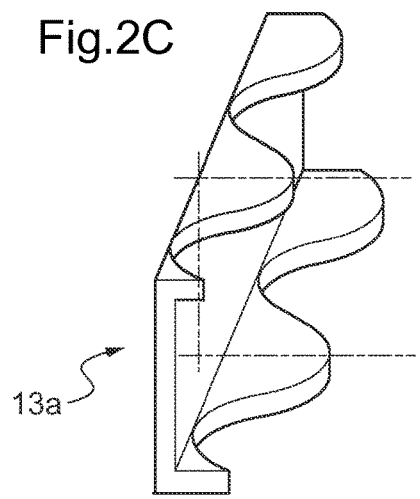

For example, each tooth 14 of an extreme side 131 of a yoke 13 is situated facing a tooth 14 of the other extreme side 132 of this yoke 13 according to a second yoke geometry 13. The two extreme sides 131, 132 thus have shapes that are equivalent to two signals in phase, as shown in FIG. 2C.

The teeth 14 of an extreme side 131 of a yoke 13 can likewise take on any intermediate positions between a position opposite a tooth 14 of the other extreme side 132 and a position between two teeth 14 of the other extreme side 132.

Moreover, the teeth 14a, 14b of each yoke 13a, 13b may cover, to a greater or lesser extent, each face 121a, 121b of the coil 12.

According to a first coverage pattern corresponding to the coverage pattern used on the electric machine 1 of FIG. 1, the end of each tooth 14a, 14b, does not extend beyond the face 121a, 121b of the coil 12 on which the teeth 14a, 14b are located, that is, the teeth 14a, 14b end before reaching the yoke 13a, 13b that encloses it. Moreover, each intermediate side 133a, 133b of the yoke 13a, 13b extends beyond the face 121a, 121b of the coil 12 on which it is located. The yokes 13a, 13b that form this first coverage pattern are likewise shown in FIG. 2.

However, according to a second coverage pattern, the extremity of each tooth 14a, 14b can extend beyond the face 121a, 121b of the coil 12 on which the teeth 14a, 14b are located. That is, the teeth extend as far as the outer face of the yoke 13a, 13b with which they fit. In this case, each intermediate side 133a, 133b of the yoke 13a, 13b does not extend beyond the face 121a, 121b of the coil 12 on which it is located.

The receiver unit 22 cooperates with the exciter unit 11 and each row 24a, 24b of magnets 23 is located opposite the exciter unit 11 such that each magnet 23 has a first pole located in front of one of the faces 121a, 121b on which the teeth 14 fit and the other first pole located in front of a first part 26a, 26b of the structure 21 of the rotor 20. In this way the first magnetic poles of the magnets 23 cooperate with the second magnetic poles of the teeth 14 and two air gaps 30a, 30b are then formed between the receiver unit 22 and the exciter unit 11, more precisely between each row 24a, 24b of magnets 23 and each face 121a, 121b.

Furthermore, the total number of magnets 23 is equal to the total number of teeth 14.

In fact, when an alternating electric current passes through the coil 12 when operating in the motor mode, each tooth 14 is magnetized, alternately forming the second north poles and the second south poles on each face 121a, 121b.

Consequently, a magnetic flux F circulates in the electric machine 1 as shown in FIG. 1B, along a section A-A. This magnetic flux F thus circulates from a first north pole of the rotor 20 toward a second south pole of the stator 10, and then from a second north pole of the stator 10 toward a first south pole of the rotor 20.

Moreover, the magnetic flux F splits at the level of the stator 10 after a second south pole of the yoke 13 and is steered in an equivalent manner toward the two second north poles of this yoke 13 that are closer than the second south pole. However, a small part of this magnetic flux F may possibly move toward other second north poles of this yoke 13.

Then the magnetic flux F coming principally from two second south poles of this yoke 13 regroup at each second north pole of this yoke 13 before passing through each air gap.

Then, at the level of the rotor 20, the magnetic flux F divides again after a magnet 24 and steers principally and in an equivalent manner toward two other magnets 24 of the rotor 20. The magnetic flux F coming from two magnets 24 then regroups before circulating in a magnet 24 and passing through an air gap.

Thus, this magnetic flux F circulates alternately on each face 121a, 121b, with the magnetic flux transfer F between each face 121a, 121b taking place through the yokes 13a, 13b.

Likewise, while operating in the generator mode, the rotation of the rotor 20 causes the magnetization of the teeth 14 of the yokes 13, and consequently the circulation of a magnetic flux F. An alternating electric current thus appears in the exciter unit 11.

In order to permit good circulation of the magnetic flux F, the teeth 14 can have different shapes, including both sharp edges and smooth radii of curvature. Examples of these tooth forms 14 are shown in FIG. 3. The optimum shape of these teeth 14 is "a wave" that corresponds in fact to a regular sinusoidal wave shown in FIG. 3A, but this optimum shape is difficult to implement industrially. The teeth will preferably have the shape of a "cat's tongue" or a "stairway", according to FIGS. 3B and 3C respectively, which enable a good compromise to be achieved between the efficiency of these shapes and their fabrication, particularly by the compaction of steel powder. FIGS. 3D to 3H illustrate various other shapes.

Moreover, in order to permit good circulation of the magnetic flux F in the stator 10, and more particularly in each yoke 13, the section of the yoke 13 at the base of each tooth 14 should be defined with attention paid to the space between each extreme side 131, 132 and the intermediate side 133. In effect, a shape that is not well adapted could lead to saturation of the magnetic flux F in the yoke 13, and consequently to a loss of performance in the electric machine 1. Examples of these sections of the yoke 13 are shown in FIGS. 4A to 4D, with the preferred section of the yoke 13 being a chamfered section according to FIG. 4A.

In the electric machine 1 shown in FIG. 1A, the magnets 23 are axial, i.e., the two poles of each magnet 23 are oriented parallel to the axis of rotation 2, and the teeth 14 are positioned perpendicular to the axis of rotation 2 of the electric machine 1 and the two air gaps 30a,30b are consequently perpendicular to that axis of rotation 2. The magnetic flux F is de facto axial, i.e., it circulates parallel to the axis of rotation 2. The electric machine 1 shown in FIG. 1A is thus an electric machine with a 3D axial magnetic flux.

FIG. 5 is a variant of the first embodiment of the invention. According to FIG. 5A, such an electric machine 1 includes, as previously, an axis of rotation 2, a stator 10 and a rotor 20 that revolves about the axis of rotation 2 and inside and outside of the stator 10.

The rotor 20 has a structure 21 and an annular receiver unit 22 equipped with two rows 24a, 24b of magnets 23, having a first row 24a located outside the stator 10 and the exciter unit 11, and a second row 24b located inside the stator 10 and the exciter unit 11. This structure 21 of the rotor 20 includes two first parts 26a, 26b on which the two rows 24a, 24b of magnets 23 are respectively positioned, and a second part 25 that allows the fastening of these two first parts 26a, 26b.

The stator 10 includes an armature 19 and an annular exciter unit 11 that is equipped with a coil 12 and two identical annular yokes 13a, 13b. The two faces 121a, 121b of the coil 12 on which the teeth 14 of the two yokes 13 fit are likewise parallel to the axis of rotation 2. Moreover, the yokes 13a, 13b according to the first geometry are each tooth 14 of an extreme side 131 of a yoke 13 being located between two teeth 14 of the other extreme side 132 of this yoke 13, and according to the second coverage pattern, i.e., that the extremity of each tooth 14 extends beyond the face 121a, 121b of the coil 12.

In this variant the magnets 23 are radial, i.e., the two poles of each magnet 23 are oriented perpendicular to the axis of rotation 2 and the teeth 14 are positioned parallel to the axis of rotation 2 of the electric machine 1. Consequently, the two air gaps 30a, 30b are parallel to this axis of rotation 2. The magnetic flux F de facto circulates radially, i.e., it circulates perpendicular to the axis of rotation 2. The electric machine 1 shown in FIG. 5A is thus an electric machine with a 3D radial magnetic flux.

The magnetic flux F circulates in the electric machine 1 as shown in FIG. 5B along a section A-A, and in the same manner as previously described.

FIGS. 5C and 5D show the two sections B-B and C-C respectively according to the two faces 121b and 121a and describe how the two yokes 13a, 13b fit, as well as the optimal shape for each tooth 14, i.e., a "wave."

FIGS. 6 to 10 show other variants of the first embodiment of the invention comprising a plurality of exciter units 11 and a plurality of receiver units 22, thereby permitting an increase in performance of the electric machine 1, notably its torque.

Figure 6:
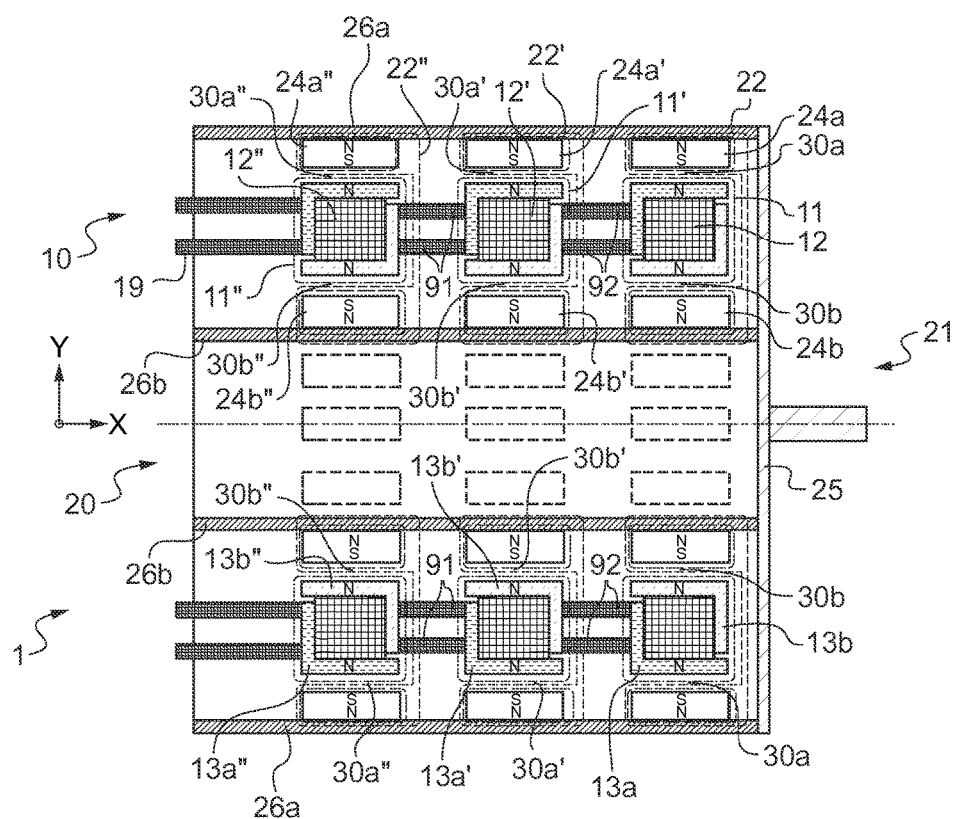

FIG. 6 shows an electric machine 1 with a radial 3D magnetic flux including three exciter units 11, 11', 11" and three receiver units 22, 22', 22". This variant actually consists of three electric machines with a radial 3D magnetic flux, as shown in FIG. 5A, that were associated to form a single electric machine 1. This association is implemented axially, with the three exciter units 11, 11', 11" forming a line parallel to the axis of rotation 2.

The three exciter units 11, 11', 11" are separated from each other by non-magnetic elements 91, 92 of the armature 19 and function independently of each other, with a radial 3D magnetic flux circulating simultaneously in each subassembly consisting of one exciter unit 11, 11', 11" and one receiver unit 22, 22', 22".

Furthermore, there is no angular offset between each exciter unit 11, 11', 11", inasmuch as all of the exciter units 11, 11', 11" are powered by the same monophase alternating electric current in motor operating mode. However, the three exciter units 11, 11', 11" may for example be powered by three phases of a balanced three-phase alternating electric current if an angular offset is provided between each exciter unit 11, 11', 11" about the axis of rotation 2.

Similarly, in generator operating mode, the rotation of the rotor 20 causes the appearance of a monophase alternating electric current in each exciter unit 11, 11', 11" if there is no angular offset between each exciter unit 11, 11', 11". Conversely, if there is an angular offset between each exciter unit 11, 11', 11" about the axis of rotation 2, a balanced three-phase alternating electric current appears in each exciter unit 11, 11', 11".

Figure 7:
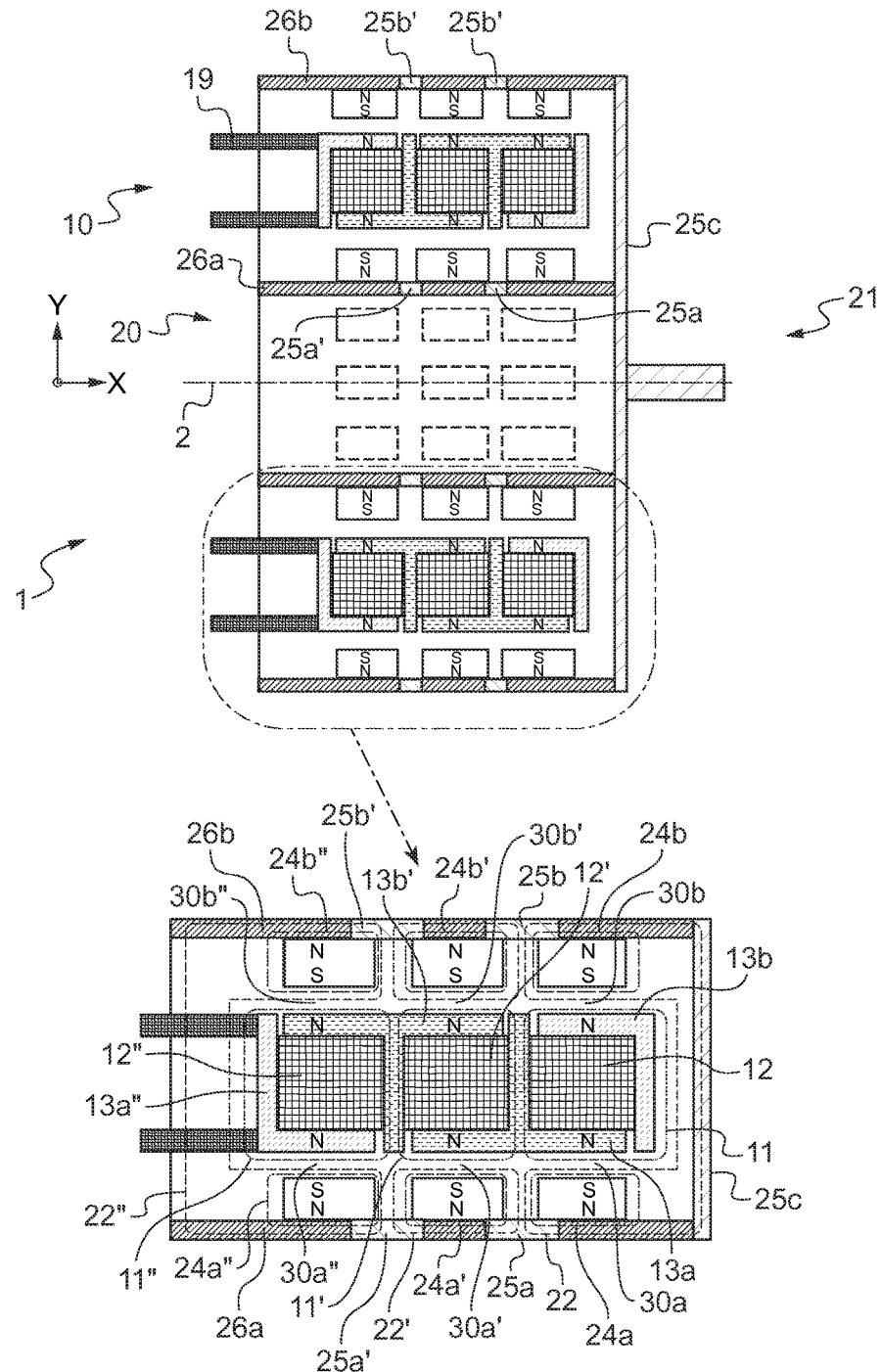

The dimensions of such electric machine 1, as well as its component count, can be reduced, for example, by associating three exciter units, as shown in FIG. 7. In this case, the exciter units 11, 11' are separated only by a yoke 13a that is used jointly by these two exciter units 11, 11', and the exciter units 11', 11" are separated only by a yoke 13b' that is used jointly by these two exciter units 11', 11".

The yokes 13 are thus arranged according to the first coverage pattern, in which the extremity of each tooth 14 does not extend beyond the face 121 of the coil 12, 12', 12". In fact, the second coverage pattern of the teeth 14 on the faces 121 of the coil 12, 12', 12" makes such an architecture for the electric machine 1 impossible without the significant presence of significant and unacceptable magnetic leakage between the pairs consisting of an exciter unit 11, 11', 11" and a receiver unit 22, 22', 22".

The three exciter units 11, 11', 11" also function independently of each other, with a radial 3D magnetic flux circulating simultaneously in each subassembly consisting of one exciter unit 11, 11', 11" and one receiver unit 22, 22', 22'. However, to ensure this independence, it is preferable for each receiver unit 22, 22', 22" to be magnetically isolated. In fact, in contrast to the electric machine 1 shown in FIG. 6, the exciter units 11,11',11" are separated by the yokes 13a, 13b', which are made of a ferromagnetic material. Indeed, in order to avoid, in particular, magnetic leakage between the exciter units 11, 11', 11" and a receiver units 22, 22', 22", the structure 21 of the rotor 20 includes second parts 25a, 25a', 25b, 25b', 25c made of a non-magnetic material that isolates the first parts 26a, 26b between each row 24a, 24b, 24a', 24b', 24a", 24b" of magnets 23.

Here again, there is no angular offset between each exciter unit 11, 11', 11", inasmuch as the exciter units 11, 11" are powered by the same monophase alternating electric current, while unit 11' is powered by an alternating electric current that is inverted in relation to the exciter units 11, 11" in motor operating mode. In fact, a magnetic flux from each exciter unit 11 and 11' passes through the same yoke 13a. Furthermore, a magnetic flux revolves naturally about the current, in a direction that is predetermined by the direction of this current. Indeed, when the two currents circulating in two adjacent exciter units 11, 11' are inverted, the two magnetic fluxes passing through the same yoke 13a are separated from each other in this yoke 13a, ensuring that they will be directed toward the corresponding receiver unit 22, 22', with the two magnetic fluxes thus remaining independent. The same holds true for the exciter units 11', 11".

However, the three exciter units 11, 11', 11" may for example be powered by three phases of a balanced three-phase alternating electric current if an angular offset is provided for each exciter unit 11, 11', 11" and each receiver unit 12, 12', 12" about the axis of rotation 2. In the same way as in the case of a monophase alternating electric current, the exciter unit 11', surrounded by the exciter units 11, 11", is traversed by an inverted phase of this three-phase alternating electric current, which current is balanced in relation to the phases of this current circulating in the other exciter units 11, 11".

FIG. 8 shows an electric machine 1 with an axial 3D magnetic flux consisting of three electric machines with an axial 3D magnetic flux and an external rotor that are associated to form a single electric machine 1. This association is implemented axially, with the three exciter units 11, 11', 11" forming a line parallel to the axis of rotation 2.

The three exciter units 11, 11', 11" function independently of each other, with an axial 3D magnetic flux circulating simultaneously in each subassembly consisting of one exciter unit 11, 11', 11" and one receiver unit 22, 22', 22".

On the one hand, the second part 25 of the structure 21 of the rotor 20 allows each first part 26a, 26a', 26a", 26b of the structure 21 of the rotor 20 to be magnetically isolated between each receiver unit 22, 22', 22", and, on the other hand, it allows the weight of the rotor 20 to be reduced. Consequently, the first parts 26'a and 26"a are common to two receiver units, namely, receiver units 22, 22' and receiver units 22', 22", respectively.

Furthermore, the yokes are arranged according to the second coverage pattern, in which the extremity of each tooth of a yoke does extend beyond the face of the coil; in other words, the teeth of a yoke extend to the end of the other yoke of the same exciter unit 11, 11', 11".

FIG. 9 shows an electric machine 1 with an axial 3D magnetic flux including three exciter units and three receiver units that are associated radially, with the three exciter units forming a line perpendicular to the axis of rotation 2.

In the same way as for the variant shown in FIG. 7, two adjacent exciter units are separated by a yoke that is used jointly by these two exciter units, so as to reduce the space requirement of such an electric machine 1. Similarly, the yokes are arranged according to the first coverage pattern, in which the extremity of each tooth of a yoke does not extend beyond the face of the coil.

An axial 3D magnetic flux thus circulates simultaneously in each subassembly consisting of one exciter unit and one receiver unit.

Each first part 26a, 26b of the structure 21 of the rotor 20 of each receiver unit 22, 22', 22" is separated by second parts 25a, 25b, 25a', 25b', 25c of the structure 21 of the rotor 20, thus allowing them to be magnetically isolated.

FIG. 10 shows a simultaneously radial and axial association of six exciter units and six receiver units. In fact, this electric machine 1 includes two subassemblies consisting of the variant shown in FIG. 9, namely, three exciter units and three receiver units that are radially associated, with these two subassemblies themselves being axially combined.

FIG. 11 shows a first embodiment of an electric machine 1 that relates to the invention. According to FIG. 11A, such an electric machine 1 includes an axis of rotation 2, a stator 10 and a rotor 20 that revolves about the axis of rotation 2 and inside the stator 10.

The rotor 20 includes a structure 21 and an annular receiver unit 22 equipped with three rows 24a, 24b, 24c of magnets 23, with each magnet 23 having a first north pole and a first south pole. Each row 24a, 24b thereby consists of alternating first north poles and first south poles.

This structure 21 of this rotor 20 includes three first parts 26a, 26b, 26c, made of a ferromagnetic material, upon which are positioned, respectively, the three rows 24a, 24b, 24c of magnets 23, and a second part 25a, 25b that allows these three first parts 26a, 26b, 26c to be attached, while ensuring magnetic isolation between them, with this second part 25a, 25b being made of a non-magnetic material.

Figure 12:
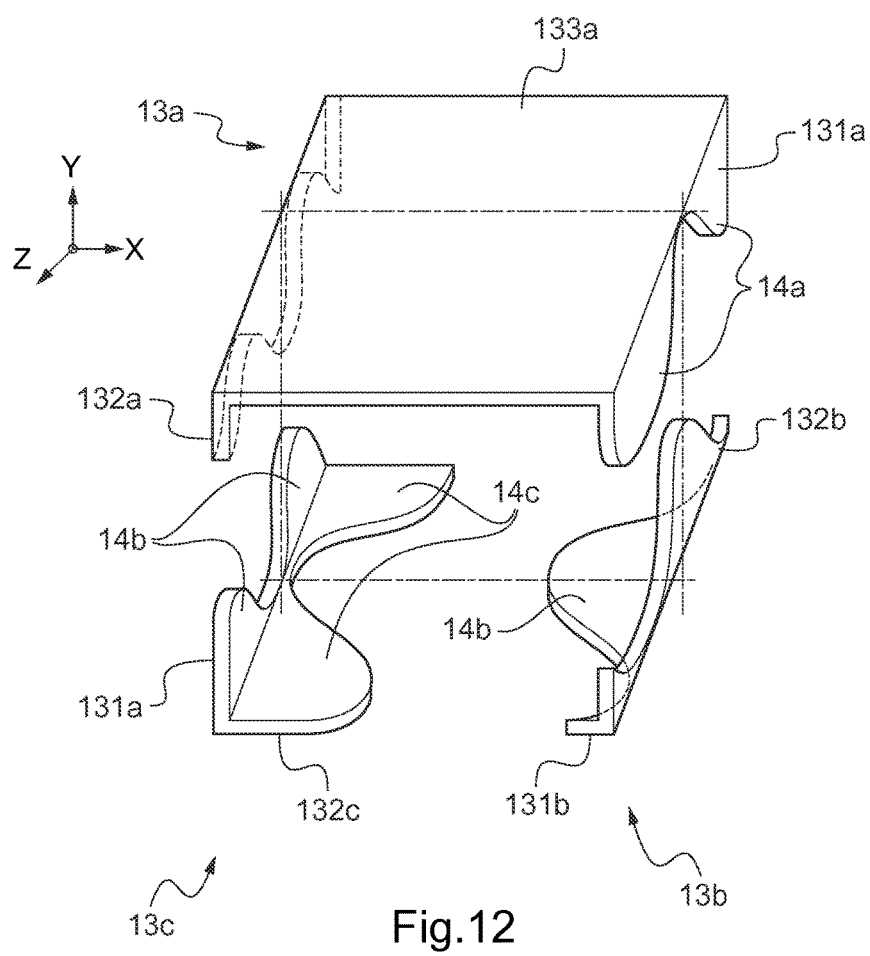
FIG. 12 shows the yokes of this second embodiment.

The stator 10 includes an armature 19 and an annular exciter unit 11 that is equipped with a coil 12 and two identical annular yokes 13a, 13b. A portion of these yokes 13 is shown in FIG. 12. A yoke 13a includes three sides, two of which are extreme sides 131a, 132a and one of which is an intermediate side 133a, and two yokes 13b, 13c that include two extreme sides 131b, 132b and 131c, 132c, respectively. The coil 12 is located inside the three yokes 13a, 13b, 13c in order to form an exciter unit 11.

Each extreme side 131,132 includes a plurality of teeth 14 distributed angularly in a regular manner about the axis of rotation 2. For the yoke 13a, the teeth 14 are distributed in accordance with the first yoke geometry, with each tooth 14 of an extreme side 131a of the yoke 13a being located between two teeth 14 of the other extreme side 132a of this yoke 13a. Conversely, the teeth 14 of the yokes 13b, 13c are distributed in accordance with the second yoke geometry, with each tooth 14 of an extreme side 131b,131c of the yokes 13b,13c being located facing a tooth 14 of the other extreme side 132b, 132c of these yokes 13b, 13c.

However, these teeth 14 may be distributed differently between the two extreme sides 131, 132 of the yokes 13a, 13b, 13c.

Furthermore, the teeth 14 of each yoke 13a, 13b, 13c are arranged according to the first coverage pattern, such that the extremity of each tooth 14 does not extend beyond the face 121a, 121b, 121c of the coil 12. That is, the teeth 14 stop in front of the yoke with which they fit.

The teeth 14 of the three yokes 13 fit into each other on three faces 121a, 121b, 121c of the coil 12, maintaining a constant distance "d" between them, as shown in FIGS. 11C, 11D, and 11E. These three figures represent the three cross-sections B-B, C-C, and D-D along the three faces 121a, 121b, 121c, respectively.

The receiver unit 22 cooperates with the exciter unit 11, with each row 24a, 24b, 24c of magnets 23 being positioned facing the exciter unit 11 in such a way that each magnet 23 has a first pole positioned facing one of the faces 121a, 121b, 121c onto which the teeth 14 fit, with the other first pole positioned facing a first part 26a, 26b of the structure 21 of the rotor 20.

Furthermore, the total number of magnets 23 is equal to the total number of teeth 14.

In fact, when an alternating electric current passes through the coil 12 when operating in the motor mode, each tooth 14 is magnetized, alternately forming the second north poles and the second south poles on each face 121a, 121b, 121c.

Indeed, the first magnetic poles cooperate with the second magnetic poles formed by each tooth 14, and three air gaps 30a, 30b, 30c are thus formed between the receiver unit 22 and the exciter unit 11, more specifically, between each row 24a, 24b, 24c of magnets 23 and each face 121a, 121b, 121c.

Consequently, a magnetic flux F circulates in the electric machine 1 as shown in FIG. 11B, along a section A-A. This magnetic flux F thus circulates from a first north pole of the rotor 20 toward a second south pole of the stator 10, and then from a second north pole of the stator 10 toward a first south pole of the rotor 20. Furthermore, in the same way as in the first embodiment of the invention, this magnetic flux F is divided and recombined in the vicinity of each yoke 13 of the stator 10 and in the vicinity of each magnet 23 of the rotor 20.

Thus, in a manner analogous to its behavior in the first embodiment, this magnetic flux F circulates alternately to each face 121a, 121b, 121c, with the transfer of the magnetic flux F between each face 121a, 121b, 121c taking place by means of the yokes 13a, 13b, 13c.

In the electric machine 1 shown in FIG. 11A, two air gaps 30a, 30c are oriented perpendicular to the axis of rotation 2, and one air gap 30b is oriented parallel to this axis of rotation 2. Indeed, the magnetic flux F circulates both axially and radially. The electric machine 1 shown in FIG. 11A is thus a multi-air-gap electric machine with a 3D magnetic flux.

FIG. 13 shows a variant of the second embodiment of the invention, which includes, in the same way as before, an axis of rotation 2, a stator 10, and a rotor 20 rotating about the axis of rotation 2 and outside the stator 10.

The rotor 20 includes a structure 21 and an annular receiver unit 22 equipped with three rows of magnets 23, and the stator 10 includes an armature 19 and an annular exciter unit 11 equipped with a coil 12 and three annular yokes 13a, 13b, 13c. According to this variant, the rotor 20 rotates about the axis of rotation 2 outside the stator and outside the exciter unit 11. This structure 21 of this rotor 20 includes three first parts 26a, 26b, 26c, upon which are positioned, respectively, the three rows of magnets 23, and a second part 25a, 25b that allows these three first parts 26a, 26b, 26c to be attached, while ensuring magnetic isolation between them.

Each yoke 13a, 13b, 13c includes a plurality of teeth that are distributed angularly, in a regular manner, on each extreme side about the axis of rotation 2. For the two yokes 13b, 13c, the teeth are distributed according to the second yoke geometry, with each tooth of one extreme side being positioned facing a tooth of the other extreme side, while the yoke 13a is arranged according to the first geometry, with each tooth of one extreme side being positioned between two teeth of the other extreme side of this yoke 13a, 13b, 13c. Furthermore, the teeth 14 of the yoke 13a are arranged according to the second coverage pattern, with the extremity of each tooth extending beyond the face of the coil. That is, the teeth extend just as far as the yoke with which they fit. Similarly, the teeth of the yokes 13b, 13c are arranged according to the second coverage pattern on the face that fits with the teeth of the yoke 13a. Conversely, the teeth of these yokes 13b, 13c are arranged according to the first coverage pattern on the face where the teeth of these two yokes 13b, 13c fit, so as to avoid interference with the teeth of yoke 13a.

FIGS. 14 through 17 show other variants of the second embodiment of the invention, which include multiple exciter units and multiple receiver units, thereby making it possible to enhance the performance of the electric machine 1, including, in particular, its torque.

FIG. 14 shows an electric machine 1 with a multi-air-gap 3D magnetic flux including three exciter units and three receiver units. This variant actually consists of three electric machines with a multi-air-gap 3D magnetic flux, as shown on FIG. 13, that were associated to form a single electric machine 1. This association is implemented axially, with the three exciter units forming a line parallel to the axis of rotation 2.

Furthermore, there is no angular offset between each exciter unit about the axis of rotation 2, inasmuch as all of the exciter units are powered by the same monophase alternating electric current in motor operating mode.

However, the three exciter units may for example be powered by three phases of a balanced three-phase alternating electric current if an angular offset is provided between each exciter unit.

FIGS. 15 and 16 respectively show an electric machine 1 with a multi-air-gap 3D magnetic flux consisting of three exciter units and three receiver units that are radially associated, with the rotor 20 rotating inside the stator 10 in the electric machine 1 shown in FIG. 15, and with the rotor 20 rotating outside the stator 10 in the electric machine 1 shown in FIG. 16.

In order to limit the dimensions of such electric machines 1 and their component count, a yoke ensures the separation between two adjacent exciter units and is used jointly by these two exciter units. Furthermore, likewise with the goal of limiting the dimensions of such electric machines 1, two exciter units include two yokes and cooperate with receiver units that include two rows of magnets, while the third exciter unit includes three yokes and cooperates with a receiver unit that includes three rows of magnets.

Furthermore, the electric machine 1 shown in FIG. 15 and the one shown in FIG. 16 do not have an angular offset between each exciter unit about the axis of rotation 2, such that the two exciter units surrounding the central exciter unit must be powered by a monophase alternating electric current, whereas the central exciter unit must be powered by an inverted monophase alternating electric current. Such electric machines 1 may however include an angular offset between each exciter unit about the axis of rotation 2, with the two exciter units surrounding the central exciter unit thus being powered by a balanced three-phase alternating electric current while the central exciter unit is powered by an inverted phase of this monophase alternating electric current in motor operating mode.

Figure 17:
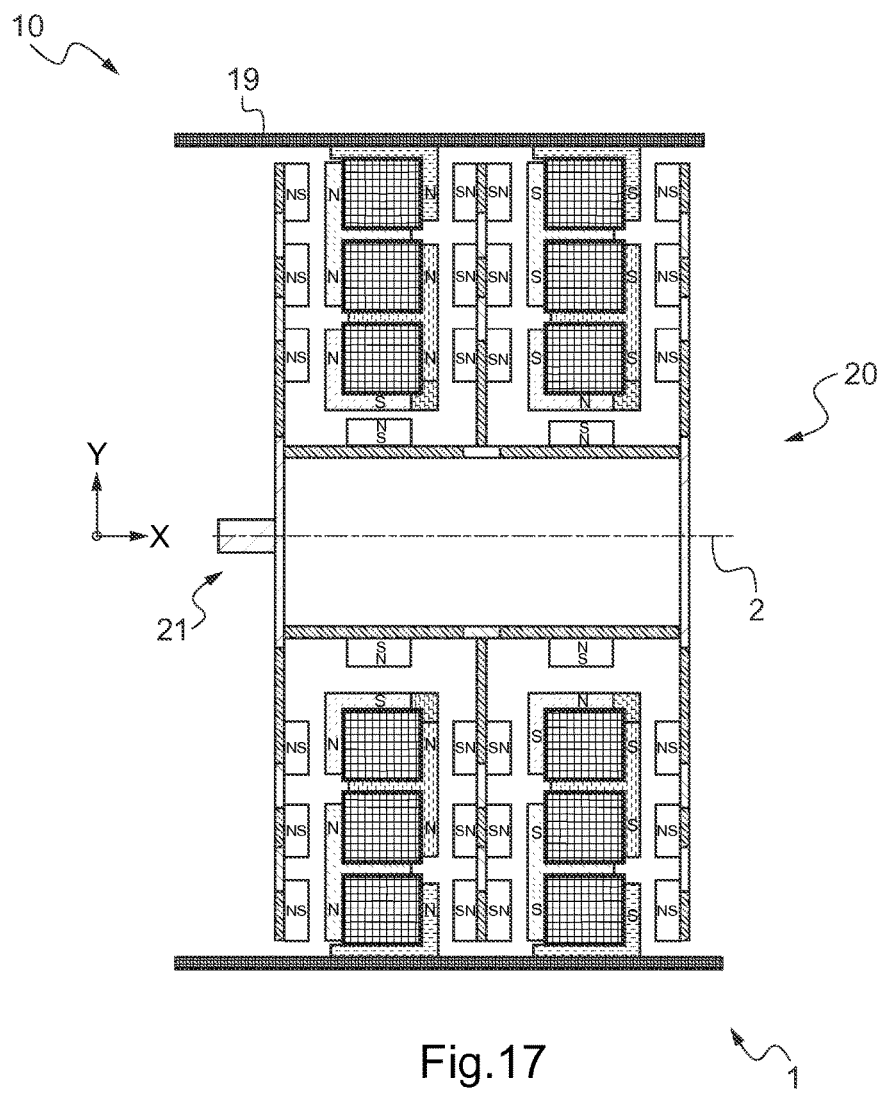

FIG. 17 shows a simultaneously radial and axial association of six exciter units and six receiver units. In fact, this electric machine 1 includes two subassemblies consisting of the variant shown in FIG. 15, namely, three exciter units and three receiver units that are radially associated, with these two subassemblies themselves being axially combined, with the rotor 20 rotating inside the stator 10.

FIG. 18 shows a third embodiment of an electric machine 1 that relates to the invention. According to FIG. 18A, such an electric machine 1 includes an axis of rotation 2, a stator 10 and a rotor 20 that revolves about the axis of rotation 2 and inside the stator 10.

The rotor 20 includes a structure 21 and an annular receiver unit 22 equipped with four rows 24$a$, 24$b$, 24$c$, 24$d$ of magnets 23, with each magnet 23 having a first north pole and a first south pole. Each row 24$a$, 24$b$, 24$c$, 24$d$ thereby consists of alternating first north poles and first south poles. This structure 21 of this rotor 20 includes four first parts 26$a$, 26$b$, 26$c$, 26$d$ upon which are positioned, respectively, the four rows 24$a$, 24$b$, 24$c$, 24$d$ of magnets 23, and a second part 25$a$, 25, 25$c$ that allows these four first parts 26$a$, 26$b$, 26$c$, 26$d$ to be attached, while ensuring magnetic isolation between them.

Figure 19:
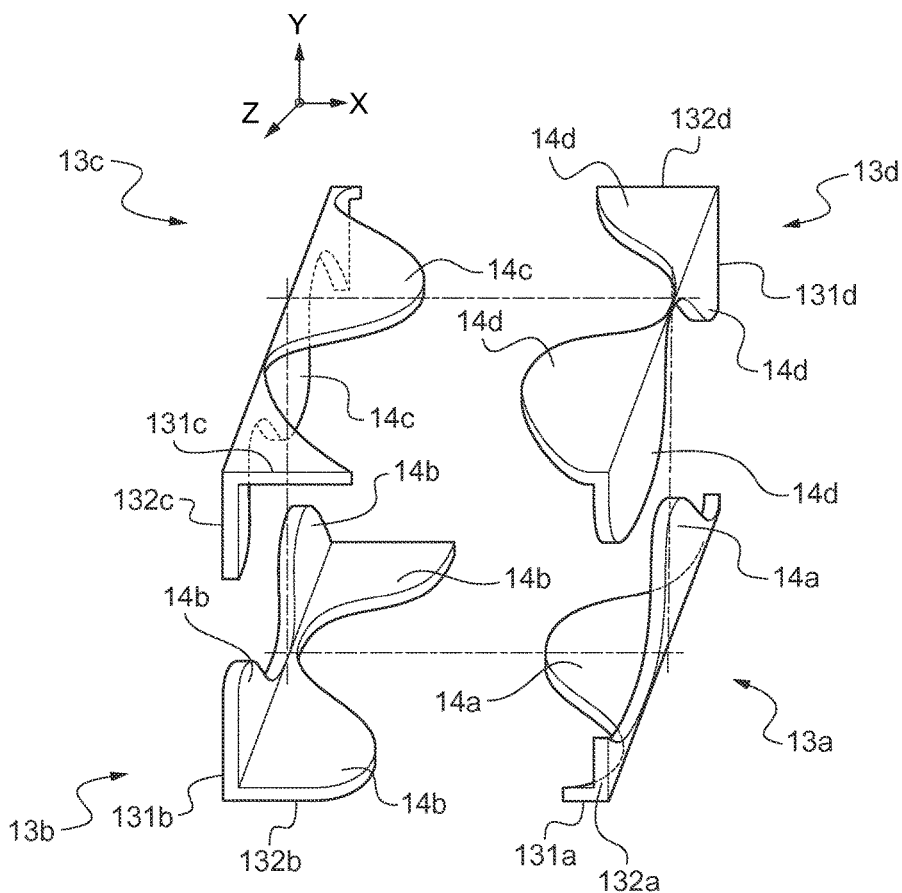
FIG. 19 shows the yokes of this third embodiment.

The stator 10 includes an armature 19 and an annular exciter unit 11 equipped with a coil 12 and four annular yokes 13$a$, 13$b$, 13$c$, 13$d$. A portion of these yokes 13 is shown in FIG. 19. Each yoke 13$a$, 13$b$, 13$c$, 13$d$ includes two extreme sides 131, 132, and the coil 12 is positioned inside the four yokes 13$a$, 13$b$, 13$c$, 13$d$ so as to form the exciter unit 11.

Each extreme side 131, 132 includes a plurality of teeth 14 distributed angularly in a regular manner about the axis of rotation 2. For each yoke 13$a$, 13$b$, 13$c$, 13$d$, the teeth 14 are distributed in accordance with the second yoke geometry, with each tooth 14 of an extreme side 131$a$, 131$b$, 131$c$, 131$d$ of the yokes 13$a$, 13$b$, 13$c$, 13$d$ being positioned facing a tooth 14 of the other extreme side 132$a$, 132$b$, 132$c$, 132$d$ of these yokes 13$a$, 13$b$, 13$c$, 13$d$.

However, these teeth 14 may be distributed differently between the two extreme sides 131, 132 of the yokes 13$a$, 13$b$, 13$c$, 13$d$. For example, the four yokes 13$a$, 13$b$, 13$c$, 13$d$ are arranged according to the first geometry.

Furthermore, the teeth 14 of each yoke 13$a$, 13$b$, 13$c$ are arranged according to the first coverage pattern, such that the extremity of each tooth 14 does not extend beyond the face 121$a$, 121$b$, 121$c$ of the coil 12. That is, the teeth 14 stop in front of the yoke with which they fit.

The teeth 14 of the four yokes 13 fit into each other on four faces 121$a$, 121$b$, 121$c$, 121$d$ of the coil 12, maintaining a constant distance d between them, as shown in FIGS. 18C, 18D, 18E, and 18F. These four figures represent the four cross-sections B-B, C-C, D-D, and E-E, along the four faces 121$a$, 121$b$, 121$c$, 121$d$, respectively. Indeed, during operation in motor mode, when an alternating electric current passes through the coil 12, each tooth 14 is magnetized, alternately forming second north poles and second south poles on each face 121$a$, 121$b$, 121$c$, 121$d$.

The receiver unit 22 cooperates with the exciter unit 11, with each row 24$a$, 24$b$, 24$c$, 24$d$ of magnets 23 being positioned facing the exciter unit 11 in such a way that each magnet 23 has a first pole positioned facing one of the faces 121$a$, 121$b$, 121$c$, 121$d$ onto which the teeth 14 fit, with the other first pole positioned facing a first part 26$a$, 26$b$ of the structure 21 of the rotor 20. Thus, the first magnetic poles cooperate with the second magnetic poles, and four air gaps 30$a$, 30$b$, 30$c$, 30$d$ are formed between the receiver unit 22 and the exciter unit 11, more specifically, between each row 24$a$, 24$b$, 24$c$, 24$d$ of magnets 23 and each face 121$a$, 121$b$, 121$c$, 121$d$.

Furthermore, the total number of magnets 23 is equal to the total number of teeth 14.

Consequently, a magnetic flux F circulates in the electric machine 1 as shown in FIG. 18B, along a section A-A. This magnetic flux F thus circulates from a first north pole of the rotor 20 toward a second south pole of the stator 10, and then from a second north pole of the stator 10 toward a first south pole of the rotor 20. Furthermore, in the same way as in the foregoing embodiments of the invention, this magnetic flux F is divided and recombined in the vicinity of each yoke 13 of the stator 10 and in the vicinity of each magnet 24 of the rotor 20.

Thus, in a manner analogous to its behavior in the foregoing embodiments of the invention, this magnetic flux F circulates alternately to each face 121$a$, 121$b$, 121$c$, 121$d$, with the transfer of the magnetic flux F between each face 121$a$, 121$b$, 121$c$, 121$d$ taking place by means of the yokes 13$a$, 13$b$, 13$c$, 13$d$.

In the electric machine 1 shown in FIG. 18A, two air gaps 30$a$, 30$c$ are oriented perpendicular to the axis of rotation 2, and two air gaps 30$b$, 30$d$ are oriented parallel to this axis of rotation 2. Indeed, the magnetic flux F circulates both axially and radially. The electric machine 1 shown in FIG. 18A is thus a multi-air-gap electric machine with a 3D magnetic flux.

Figure 20:
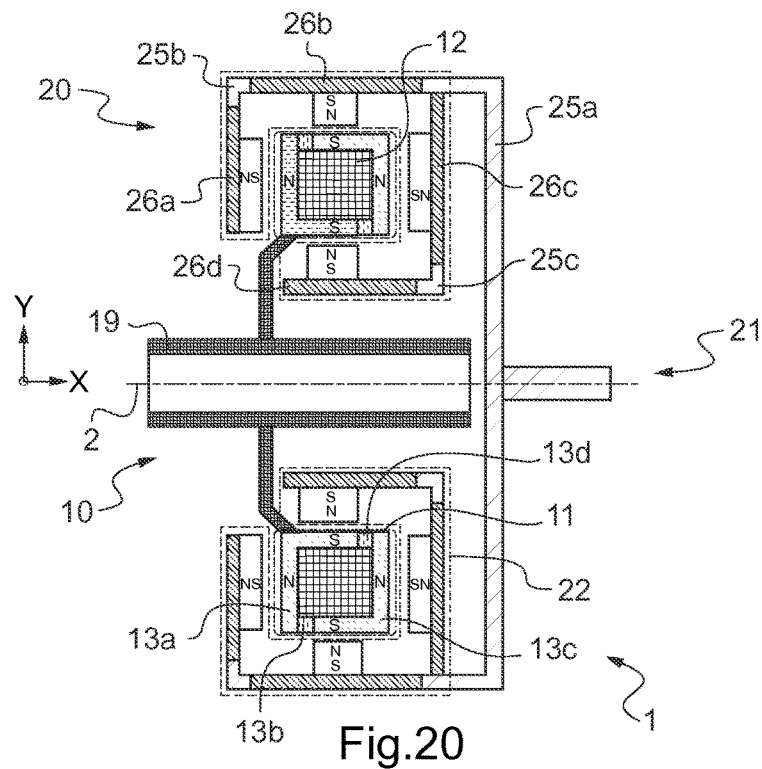
FIGS. 20 to 21 show variants of this third embodiment.

FIG. 20 shows a variant of the third embodiment of the invention, which includes, in the same way as before, an axis of rotation 2, a stator 10, and a rotor 20 rotating about the axis of rotation 2 and outside the stator 10.

The rotor 20 includes a structure 21 and an annular receiver unit 22 equipped with four rows of magnets, and the stator 10 includes an armature 19 and an annular exciter unit 11 equipped with a coil 12 and four annular yokes. According to this variant, the rotor 20 rotates about the axis of rotation 2 outside the stator and outside the exciter unit 11.

This structure 21 of this rotor 20 includes four first parts 26a, 26b, 26c, 26d upon which are positioned, respectively, the four rows 24a, 24b, 24c, 24d of magnets 23, and second parts 25a, 25, 25c that allow these four first parts 26a, 26b, 26c, 26d to be attached, while ensuring magnetic isolation between them.

According to this variant, for each yoke 13a, 13b, 13c, 13d, the teeth are distributed according to the second yoke geometry, with each tooth of one extreme side being positioned facing a tooth of the other extreme side of this yoke 13a, 13b, 13c, 13d.

Furthermore, the teeth of each yoke are arranged according to the second coverage pattern, with the extremity of each tooth extending beyond the face of the coil 12. That is, the teeth extend just as far as the yoke with which they fit.

For each yoke 13a, 13b, 13c, 13d, the teeth of one extreme side are arranged according to the first coverage pattern, whereas the teeth of the other extreme side are arranged according to the second coverage pattern. In fact, the teeth of the yokes 13a, 13b, 13c, 13d are arranged according to the second coverage pattern on two opposing faces of the coil, and are arranged according to the first coverage pattern on the other two faces of the coil, in order to avoid interference with the teeth of the yokes 13a, 13b, 13c, 13d.

Figure 21:
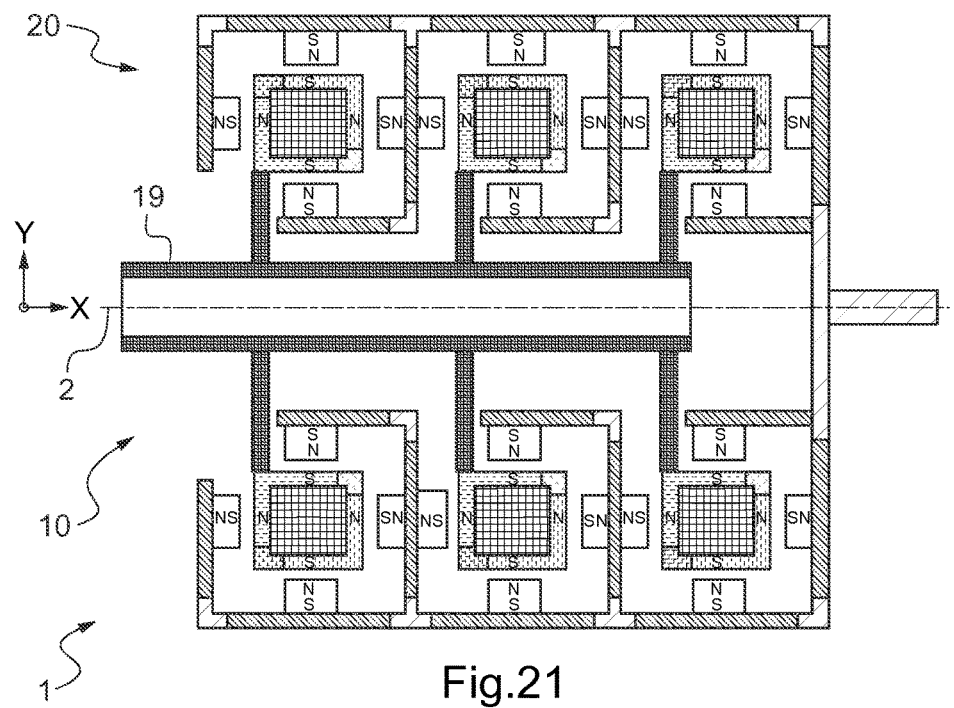

FIGS. 21 shows a variant of the third embodiment of the invention, which includes three exciter units and three receiver units, thereby making it possible to enhance the performance of the electric machine 1, including, in particular, its torque.

In this electric machine 1 with a multi-air-gap 3D magnetic flux, the three exciter units and the three receiver units are associated axially, with the three exciter units forming a line parallel to the axis of rotation 2.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. An electric machine with multiple air gaps and a 3D magnetic flux, including:
    an axis of rotation;
    a stator equipped with an armature and at least one annular exciter unit that includes a coil, a first annular yoke, and a second annular yoke, with the coil being positioned inside the first and second yokes and having at least two faces, each respective yoke of the first and second yokes including a respective plurality of teeth; and
    a rotor revolving around the axis of rotation and equipped with a structure and at least one annular receiver unit, with each respective receiver unit of the at least one receiver unit including a plurality of magnets and cooperating with a single respective exciter unit of the at least one exciter unit, with each magnet having a magnet north pole and a magnet south pole, with one of the magnet north pole and the magnet south pole being located opposite the respective exciter unit and with the other of the magnet north pole and the magnet south pole being located opposite the structure of the rotor, with the total number of magnets being equal to the total number of the teeth;
    wherein each respective yoke includes at least two respective extreme sides, the respective plurality of teeth of each respective yoke being distributed angularly along the two respective extreme sides in a regular manner about the axis of rotation, the respective pluralities of teeth of the first and second yokes being fitted into each other on one of the faces while maintaining a distance therebetween, alternately forming tooth north poles and tooth south poles, with each respective receiver unit of the at least one receiver unit including at least two rows of respective magnets of the plurality of magnets, with each row including an alternation of magnet north poles and of magnet south poles, and being located facing one of the faces, with the magnets being distributed angularly in a regular manner about the axis of rotation, thus forming an air gap between each row of magnets and the respective exciter unit, with a magnetic flux thus circulating in three dimensions inside the electric machine.

2. The electric machine with multiple air gaps and a 3D magnetic flux according to claim 1, wherein the magnets are permanent magnets.

3. The electric machine with multiple air gaps and a 3D magnetic flux according to claim 1, wherein the magnets are non-permanent magnets.

4. The electric machine with multiple air gaps and a 3D magnetic flux according to claim 1, wherein a respective extreme side of the first yoke and the second yoke is positioned perpendicular to the axis of rotation, so that the magnetic flux circulates at least axially inside the electric machine.

5. The electric machine with multiple air gaps and a 3D magnetic flux according to claim 1, wherein a respective extreme side of the first yoke and the second yoke is positioned parallel to the axis of rotation, so that the magnetic flux circulates at least radially inside the electric machine.

6. The electric machine with multiple air gaps and a 3D magnetic flux according to claim 1, wherein each tooth is in a cat's-tongue shape.

7. The electric machine with multiple air gaps and a 3D magnetic flux according to claim 1, wherein each tooth is in a stairway shape.

8. The electric machine with multiple air gaps and a 3D magnetic flux according to claim 1, wherein each respective yoke includes a connection in the form of a chamfer at the base of each respective tooth.

9. The electric machine with multiple air gaps and a 3D magnetic flux according to claim 1, wherein the respective exciter unit of the at least one exciter unit includes a third yoke and cooperates with the respective receiver unit of the at least one receiver unit that includes a third row of magnets, with three air gaps thus being formed between the respective exciter unit and the respective receiver unit.

10. The electric machine with multiple air gaps and a 3D magnetic flux according to claim 1, wherein the respective exciter unit of the at least one exciter unit includes a third yoke and a fourth yoke and cooperates with the respective receiver unit that includes a third row and a fourth row of magnets, with four air gaps thus being formed between the respective exciter unit and the respective receiver unit.

11. The electric machine with multiple air gaps and a 3D magnetic flux according to claim 1, wherein the stator includes at least two respective exciter units distributed radially with respect to the axis of rotation and the rotor includes at least two respective receiver units distributed radially with respect to the axis of rotation.

12. The electric machine with multiple air gaps and a 3D magnetic flux according to claim 1, wherein each respective exciter unit is fed by a monophase electric current.

13. The electric machine with multiple air gaps and a 3D magnetic flux according to claim 1, wherein the respective teeth of the two extreme sides of at least one respective yoke are distributed angularly in a regular manner about the axis of rotation and alternately on the two extreme sides.

14. The electric machine with multiple air gaps and a 3D magnetic flux according to claim 1, wherein the respective teeth of the two extreme sides of at least one respective yoke are oriented face to face.

15. The electric machine with multiple air gaps and a 3D magnetic flux according to claim 1, wherein an extremity of each respective tooth of a respective yoke does not extend beyond a respective face of the at least two faces of the coil.

16. The electric machine with multiple air gaps and a 3D magnetic flux according to claim 1, wherein an extremity of each respective tooth of a respective yoke does extend beyond a respective face of the at least two faces of the coil.

17. An electric machine with multiple air gaps and a 3D magnetic flux, including:
an axis of rotation;
a stator equipped with an armature and at least one annular exciter unit that includes a coil, a first annular yoke, and a second annular yoke, with the coil being positioned inside the first and second yokes and having at least two faces, each respective yoke of the first and second yokes including a respective plurality of teeth; and
a rotor revolving around the axis of rotation and equipped with a structure and at least one annular receiver unit, with each respective receiver unit of the at least one receiver unit including a plurality of magnets and cooperating with a single respective exciter unit of the at least one exciter unit, with each magnet having a magnet north pole and a magnet south pole, with one of the magnet north pole and the magnet south pole being located opposite the respective exciter unit and with the other of the magnet north pole and the magnet south pole being located opposite the structure of the rotor, with the total number of magnets being equal to the total number of the teeth;
wherein each respective yoke includes at least two respective extreme sides, the respective plurality of teeth of each respective yoke being distributed angularly along the two respective extreme sides in a regular manner about the axis of rotation, the respective pluralities of teeth of the first and second yokes being fitted into each other on one of the faces while maintaining a distance therebetween, alternately forming tooth north poles and tooth south poles, with each respective receiver unit of the at least one receiver unit including at least two rows of respective magnets of the plurality of magnets, with the at least two rows of magnets of each receiver unit being linked for rotation together, with each row including an alternation of magnet north poles and of magnet south poles, and being located facing one of the faces, with the magnets being distributed angularly in a regular manner about the axis of rotation, thus forming an air gap between each row of magnets and the respective exciter unit, with a magnetic flux thus circulating in three dimensions inside the electric machine, wherein a respective exciter unit of the at least one exciter unit cooperates with a respective receiver unit of the at least one receiver unit that includes two respective rows of magnets, with two air gaps thus being formed between the respective exciter unit and the respective receiver unit.

18. An electric machine with multiple air gaps and a 3D magnetic flux, including:
an axis of rotation;
a stator equipped with an armature and at least one annular exciter unit that includes a coil, a first annular yoke, and a second annular yoke, with the coil being positioned inside the first and second yokes and having at least two faces, each respective yoke of the first and second yokes including a respective plurality of teeth; and
a rotor revolving around the axis of rotation and equipped with a structure and at least one annular receiver unit, with each respective receiver unit of the at least one receiver unit including a plurality of magnets and cooperating with a single respective exciter unit of the at least one exciter unit, with each magnet having a magnet north pole and a magnet south pole, with one of the magnet north pole and the magnet south pole being located opposite the respective exciter unit and with the other of the magnet north pole and the magnet south pole being located opposite the structure of the rotor, with the total number of magnets being equal to the total number of the teeth;
wherein each respective yoke includes at least two respective extreme sides, the respective plurality of teeth of each respective yoke being distributed angularly along the two respective extreme sides in a regular manner about the axis of rotation, the respective pluralities of teeth of the first and second yokes being fitted into each other on one of the faces while maintaining a distance therebetween, alternately forming tooth north poles and tooth south poles, with each respective receiver unit of the at least one receiver unit including at least two rows of respective magnets of the plurality of magnets, with the at least two rows of magnets of each receiver unit being linked for rotation together, with each row including an alternation of magnet north poles and of magnet south poles, and being located facing one of the faces, with the magnets being distributed angularly in a regular manner about the axis of rotation, thus forming an air gap between each row of magnets and the respective exciter unit, with a magnetic flux thus circulating in three dimensions inside the electric machine, wherein the stator includes at least two respective exciter units distributed axially with respect to the axis of rotation and the rotor includes at least two respective receiver units distributed axially with respect to the axis of rotation.

19. The electric machine with multiple air gaps and a 3D magnetic flux according to claim 18, wherein one respective yoke separates two adjacent exciter units and is used jointly by the two adjacent exciter units, with two magnetic fluxes relating respectively to the two adjacent exciter units, circulating in the respective yoke.

20. The electric machine with multiple air gaps and a 3D magnetic flux according to claim 18, wherein at least two respective exciter units are fed by two different phases of a balanced polyphase electric current.

* * * * *